May 29, 1956 E. J. H. BUSSARD 2,748,286

COMBINED VERY-HIGH-FREQUENCY AND ULTRA-HIGH-FREQUENCY TUNER FOR TELEVISION RECEIVER

Original Filed June 29, 1951 11 Sheets-Sheet 1

INVENTOR.
EMMERY J. H. BUSSARD.
BY Alden D. Redfield
Charles M. Hogan.
ATTORNEYS.

INVENTOR.
EMMERY J. H. BUSSARD.
BY Alden D. Redfield
Charles M. Hogan.
ATTORNEYS.

INVENTOR.
EMMERY J. H. BUSSARD.
BY Alden D. Redfield
Charles M. Hogan.
ATTORNEYS.

INVENTOR.
EMMERY J. H. BUSSARD.
BY Alden D. Redfield
Charles M. Hogan.
ATTORNEYS.

INVENTOR.
EMMERY J. H. BUSSARD.
BY Alden D. Redfield
Charles M. Hogan
ATTORNEYS.

INVENTOR.
EMMERY J. H. BUSSARD.
BY Alden D. Redfield
Charles M. Hogan.
ATTORNEYS.

INVENTOR.
EMMERY J. H. BUSSARD.
BY Alden D. Redfield
Charles M. Hogan
ATTORNEYS.

INVENTOR.
EMMERY J. H. BUSSARD.
BY Alden D. Redfield
Charles M. Hogan.
ATTORNEYS.

May 29, 1956 E. J. H. BUSSARD 2,748,286

COMBINED VERY-HIGH-FREQUENCY AND ULTRA-HIGH-FREQUENCY TUNER FOR TELEVISION RECEIVER

Original Filed June 29, 1951 11 Sheets-Sheet 9

INVENTOR.
EMMERY J. H. BUSSARD.
BY Alden D. Redfield
Charles M. Hogan
ATTORNEYS.

May 29, 1956 E. J. H. BUSSARD 2,748,286

COMBINED VERY-HIGH-FREQUENCY AND ULTRA-HIGH-FREQUENCY TUNER FOR TELEVISION RECEIVER

Original Filed June 29, 1951 11 Sheets-Sheet 10

INVENTOR
EMMERY J. H. BUSSARD.
BY Alden D. Redfield
Charles M. Hogan
ATTORNEYS.

INVENTOR.
EMMERY J. H. BUSSARD.
BY Alden D. Redfield
Charles M. Hogan
ATTORNEYS.

United States Patent Office 2,748,286
Patented May 29, 1956

2,748,286

COMBINED VERY-HIGH-FREQUENCY AND ULTRA-HIGH-FREQUENCY TUNER FOR TELEVISION RECEIVER

Emmery J. H. Bussard, Cincinnati, Ohio, assignor to Avco Manufacturing Corporation, Cincinnati, Ohio, a corporation of Delaware Original application June 29, 1951, Serial No. 234,174, now Patent No. 2,694,150, dated November 9, 1954. Divided and this application December 3, 1952, Serial No. 323,775

8 Claims. (Cl. 250—40)

The present invention relates generally to tuners for television receivers and specifically to a novel adjusting mechanism and a novel ganged adjusting unit of the continuous type for selectively tuning a receiver throughout the very-high-frequency (V. H. F.) and the proposed ultra-high-frequency (U. H. F.) ranges. The present application is a division of application Serial No. 234,174 filed in the United States Patent Office on June 29, 1951 and entitled "Combined Very-High-Frequency and Ultra-High-Frequency Tuner for Television Receiver." This application has now matured into U. S. Patent 2,694,150, issued November 9, 1954.

At the present time television channels Nos. 2 through 13 are available for commercial video broadcast stations in the United States, with V. H. F. carrier frequency allocations as follows:

| Channel No.: | Megacycles |
|---|---|
| 2 | 54–60 |
| 3 | 60–66 |
| 4 | 66–72 |
| 5 | 76–82 |
| 6 | 82–88 |
| 7 | 174–180 |
| 8 | 180–186 |
| 9 | 186–192 |
| 10 | 192–198 |
| 11 | 198–204 |
| 12 | 204–210 |
| 13 | 210–216 |

The complete V. H. F. range comprises a lower V. H. F. band extending from 54 to 88 megacycles, and an upper V. H. F. band embracing the frequencies between 174 and 216 megacycles.

The Federal Communications Commission presently contemplates the allocation of a carrier frequency spectrum from 470 to 890 megacycles to television broadcast transmission and proposes to add to the present V. H. F. channels a total of 70 additional channels, Nos. 14 through 83, comprising the U. H. F. band or range. Upon the completion and final adoption of the proposed allocation plan or some similar proposal, commercially successful television receivers will require a tuner for the selection of any one of the very large number of channels within the U. H. F. and V. H. F. ranges.

The expression "tuner" is herein employed to designate the elements which are traditionally referred to as the "front end" of a television receiver, comprising the radio frequency amplifier or other preselector stage, the local oscillator, and the frequency-changing stage of a superheterodyne television receiver, the collective function of all of these elements being to select the desired channel and to convert the received carrier frequency signals into intermediate frequency signals.

Channel selection is generally accomplished, in V. H. F.

television, by one of the following three preferred methods:

(1) Continuous tuning of each selector or oscillator circuit by a variable inductance or variable capacitor, an inductance being more commonly employed;

(2) The operation of a selector switch in such a manner as to introduce into each selector or oscillator circuit an independent set of frequency-determining parameters for each channel; or (3) Step-by-step operation of a selector switch which progressively modifies, in steps, a set of frequency-determining parameters.

The second and third methods require the providing of band switches, plug-in coils, turret coil assemblies, multiple switch contacts, or complicated wiring systems. However, the selector switch tuners have to date been preferred in V. H. F. television receiver practice in spite of the foregoing disadvantages and limitations.

Among the directive concepts of the present invention are:

(1) The perception that continuous tuning is the best method which can practicably be utilized in combined U. H. F.-V. H. F. tuning by a simple control element easily manipulated by the operator; and (2) The rejection of the selector switch and equivalent methods of V. H. F. tuning in the extension of the range to cover both the U. H. F. and the V. H. F. bands.

The extremely wide tuning range required for the coverage of all V. H. F. channels (54–216 megacycles) has presented a number of problems in continuous tuning for V. H. F. television receivers, and they have now been solved in a satisfactory manner. The present invention represents a solution to a vastly more difficult problem, and that embraces the provision of an adjusting mechanism and tuner which cover in a simple and satisfactory manner a very much greater range, from 54 to 890 megacycles, inclusive of both V. H. F. and U. H. F. bands. The invention disproves the heretofore generally accepted belief that continuous tuning cannot practicably be made to cover a sufficiently wide range to include the present V. H. F. and contemplated U. H. F. bands. The expression "adjusting mechanism" is herein frequently employed to designate the combination of lumped inductance, parallel-conductor tuning line, and unitary adjusting means manipulated by the operator in tuning a selector circuit to the desired channel or a local oscillator frequency-determining circuit to the frequency appropriate for the reception of signals in the desired channel, all provided in accordance with the invention. This expression is also intended to cover a proper range of equivalents.

The invention also embraces a "ganged adjusting mechanism," and this expression is intended to designate a plurality of the novel combinations individually designated as "adjusting mechanisms."

The invention further contemplates a complete tuner including a ganged adjusting mechanism and associated tubes and circuits, all of which provide a radio-frequency (R. F.) amplifier stage having tuned input and output circuits constituting a preselector tuned to the received carrier signal frequency, and a local oscillator having a tuned tank circuit. At least one (two in the particular embodiment shown) of the mechanisms of the ganged adjusting unit is used to control the selection of carrier frequency signals in the desired channel, and another one of the mechanisms in the unit is used to control the adjustment of the local oscillator output frequency to the value appropriate to that channel.

The principal objects of the invention are to provide:

(1) In an adjusting mechanism for a television receiver tuner, the combination of a lumped inductance, means for adjusting that inductance, a tuning line, means for adjusting the electrical length of said tuning line, and unitary means for controlling both of said adjusting means;

(2) A continuous ganged adjusting mechanism for a combined U. H. F.-V. H. F. television receiver comprising a single control shaft, a plurality of spirally wound lumped inductors, means including contacts rotatable with the shaft for simultaneously short-circuiting variable portions of the inductors to tune the receiver through the V. H. F. range, a like plurality of curved tuning lines, and means including contacts rotatable with the shaft for simultaneously short-circuiting variable portions of the tuning line to tune the receiver through the U. H. F. range;

(3) A complete tuner which is adjustable throughout the V. H. F. and U. H. F. bands and satisfies the following requirements:

(*a*) The maintenance of an adequate band width for the acceptance of both picture and sound signals for any selected one of the channels;

(*b*) The provision of a response characteristic of proper symmetry with respect to the center frequency of the channel, for any desired one of the large number of channels;

(*c*) Sufficient gain and low noise level in the R. F. amplifier to apply adequate signals with a high signal-to-noise ratio to the grid of the mixer stage;

(*d*) Strong discrimination against and rejection of interfering R. F. signals, particularly image frequencies and carrier frequencies corresponding to the intermediate frequency;

(*e*) A workable match between antenna and receiver input;

(*f*) Adequate suppression of oscillator radiation;

(4) An adjusting mechanism for producing resonance conditions between extremely wide frequency limits, the lower limit being 54 megacycles and the upper limit being 890 megacycles;

(5) An adjusting mechanism which is controlled throughout that wide range by the continuous motion of a single control element;

(6) An adjusting mechanism which is easily and efficiently ganged for unicontrol with one or more similar adjusting mechanisms to form a compact unit;

(7) A combined U. H. F.–V. H. F. tuner having a single common set of R. F. amplifier, mixer, and oscillator tubes for use in both U. H. F. and V. H. F. ranges;

(8) A compact combined U. H. F.–V. H. F. tuner which occupies substantially the same space as a conventional continuous V. H. F. tuner;

(9) A conveniently manipulated U. H. F.–V. H. F. tuner;

(10) A continuous U. H. F.–V. H. F. tuner which is adjustable to cover the whole range from 54 to 890 megacycles by a relatively few turns of a single shaft;

(11) A continuous U. H. F.–V. H. F. tuner of simple, reliable construction, having no makeshift elements such as tuner strips, band switches, plug-in coils, and the like, and which utilizes a minimum number of switch contacts or equivalent sources of service trouble;

(12) A combined U. H. F.–V. H. F. tuner which facilities ready and accurate receiver alignment during factory production;

(13) A combined U. H. F.–V. H. F. tuner in which a single control element provides both gross and fine adjustments;

(14) A continuous combined U. H. F.–V. H. F. tuner in which provision is made for instantaneously traversing unused portions of the frequency spectrum, such as the portion 86 megacycles in width between channels 6 and 7 and the portion 254 megacycles in width between the present channel 13 and proposed channel 14;

(15) A combined U. H. F.–V. H. F. tuner for a television receiver comprising a plurality of adjustable tuning lines, a plurality of adjustable lumped inductors, circuit elements utilizing said lines and inductors for converting received carrier signals into intermediate frequency signals, and continuously movable unicontrol means for said lines and inductors;

(16) A novel oscillator circuit utilizing a tuning line for the U. H. F. range and an adjustable lumped inductor for the V. H. F. range;

(17) A novel preselector circuit utilizing a tuning line for the U. H. F. range and an adjustable lumped inductor for the V. H. F. range;

(18) A combined U. H. F.–V. H. F. tuner which represents a relatively small increase over the cost of a continuous V. H. F. tuner; and

(19) A ganged adjusting mechanism with which various combinations and permutations of circuits may be employed to provide a U. H. F.–V. H. F. tuner.

For a better understanding of the invention, together with other and further objects, advantages, and capabilities thereof, reference is made to the following description of the accompanying drawings, in which there are illustrated an adjusting mechanism, a ganged adjusting unit, and a complete U. H. F.–V. H. F. tuner circuit in accordance with the invention.

Figure 3:
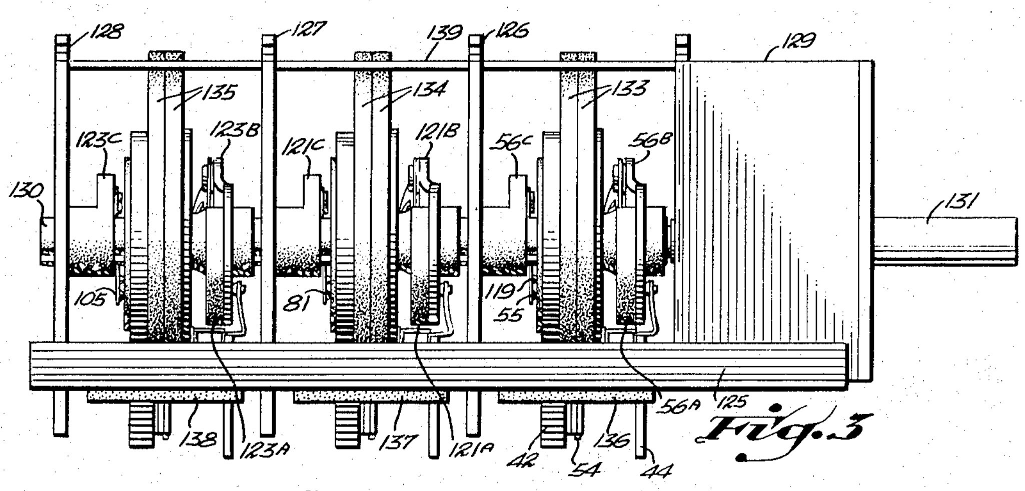
Figures 4, 5:
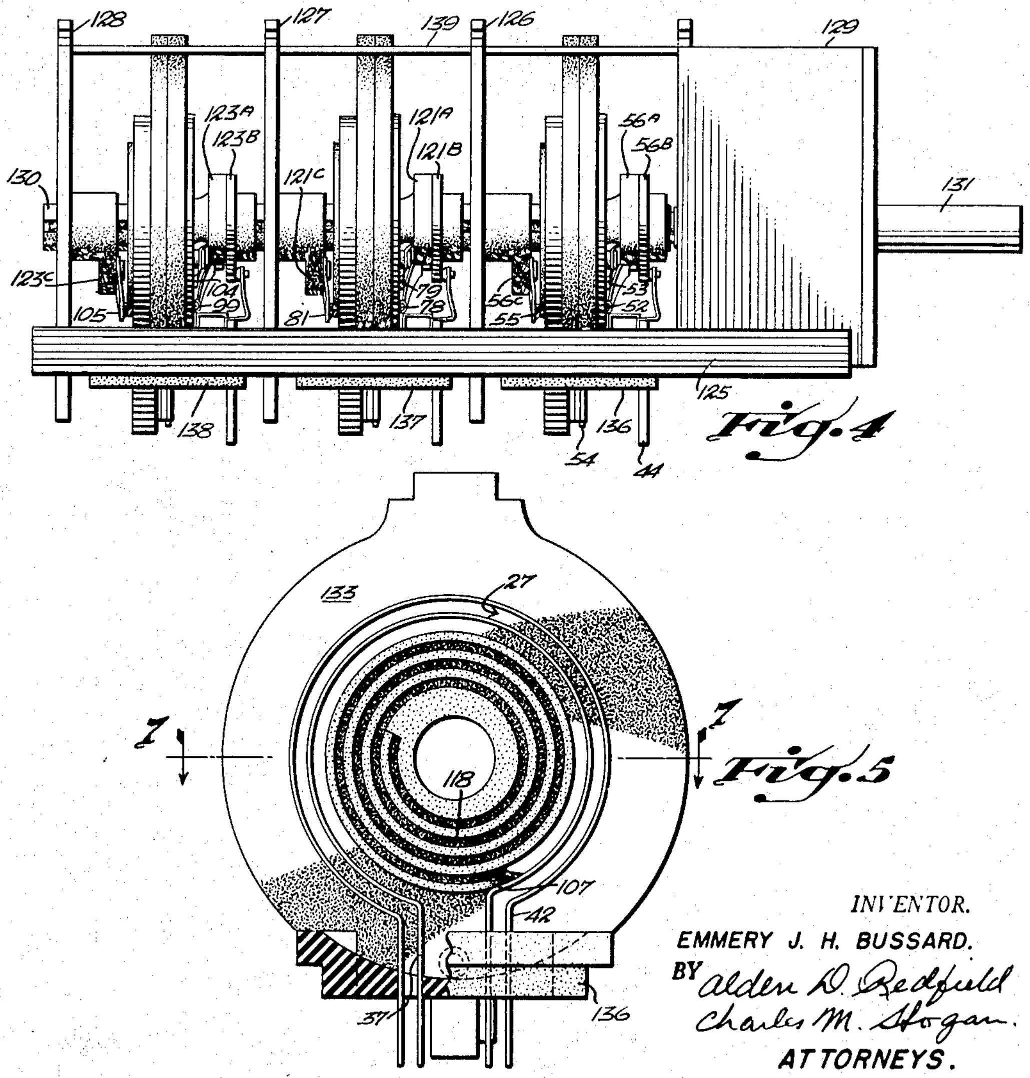
Figures 6, 7, 8:
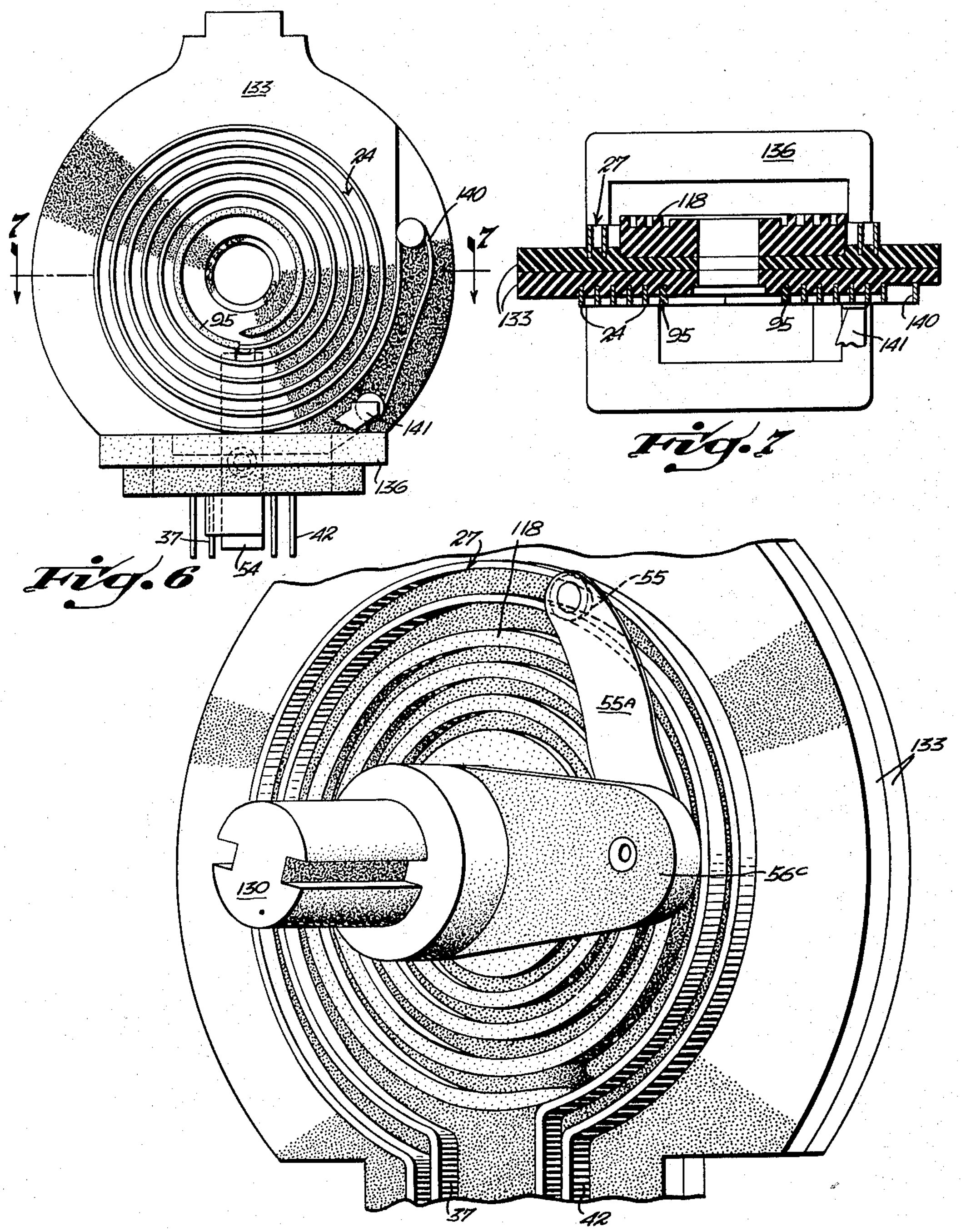
Figure 9:
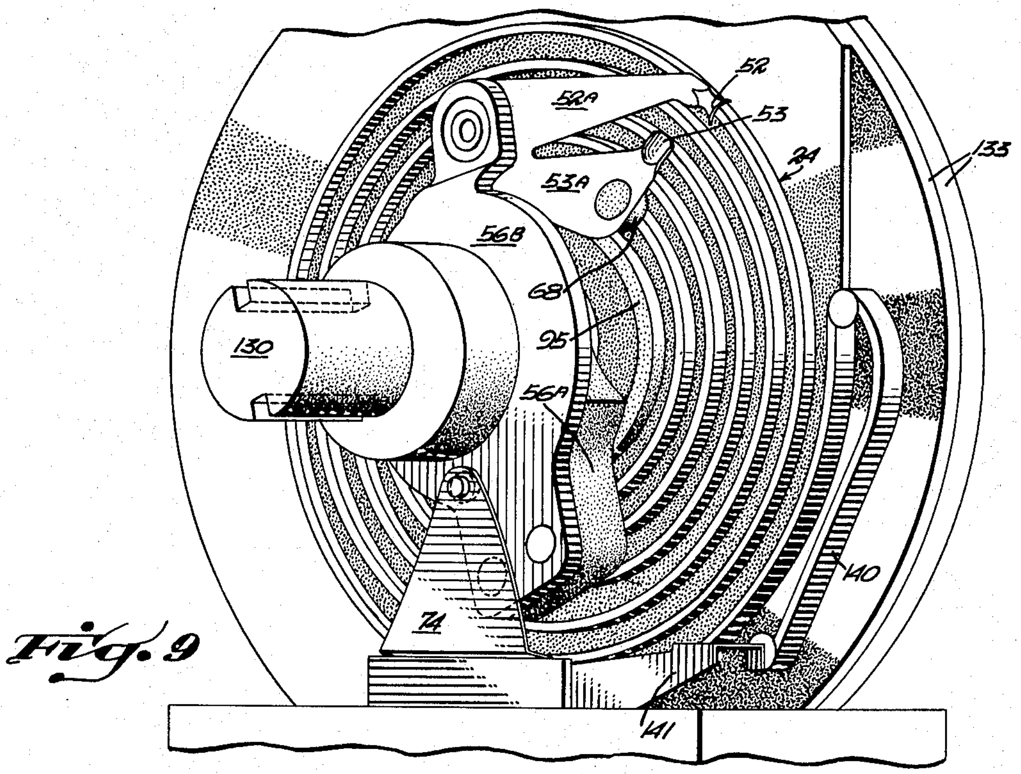
Figure 10:
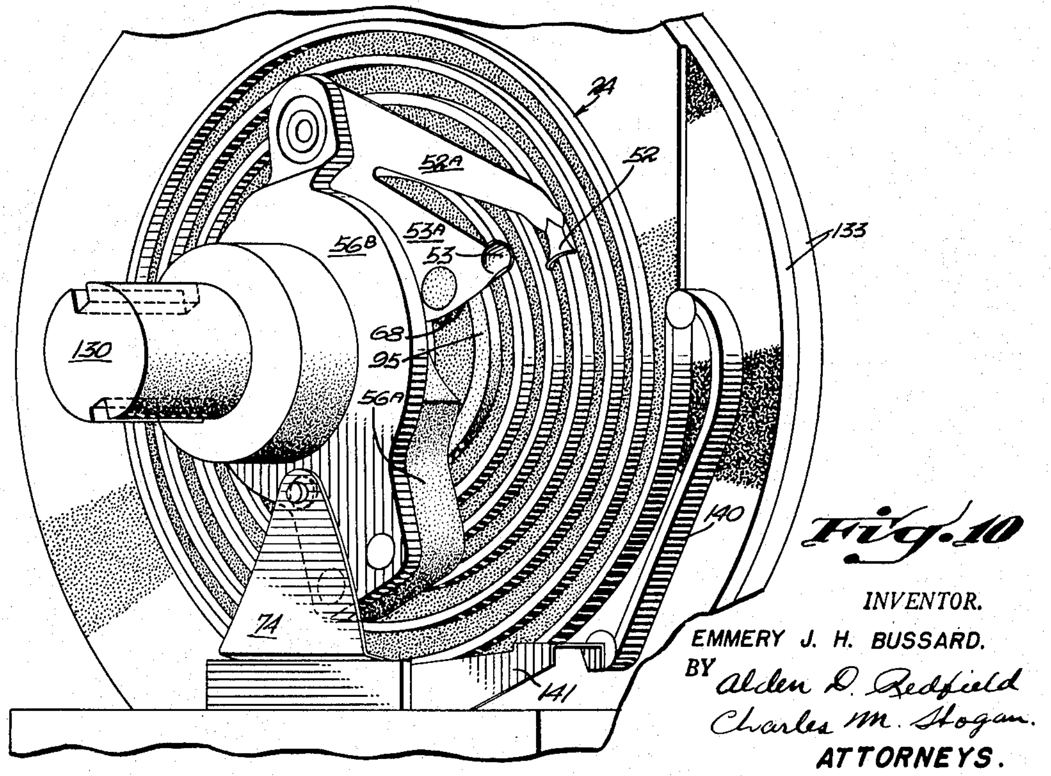
Figure 11:
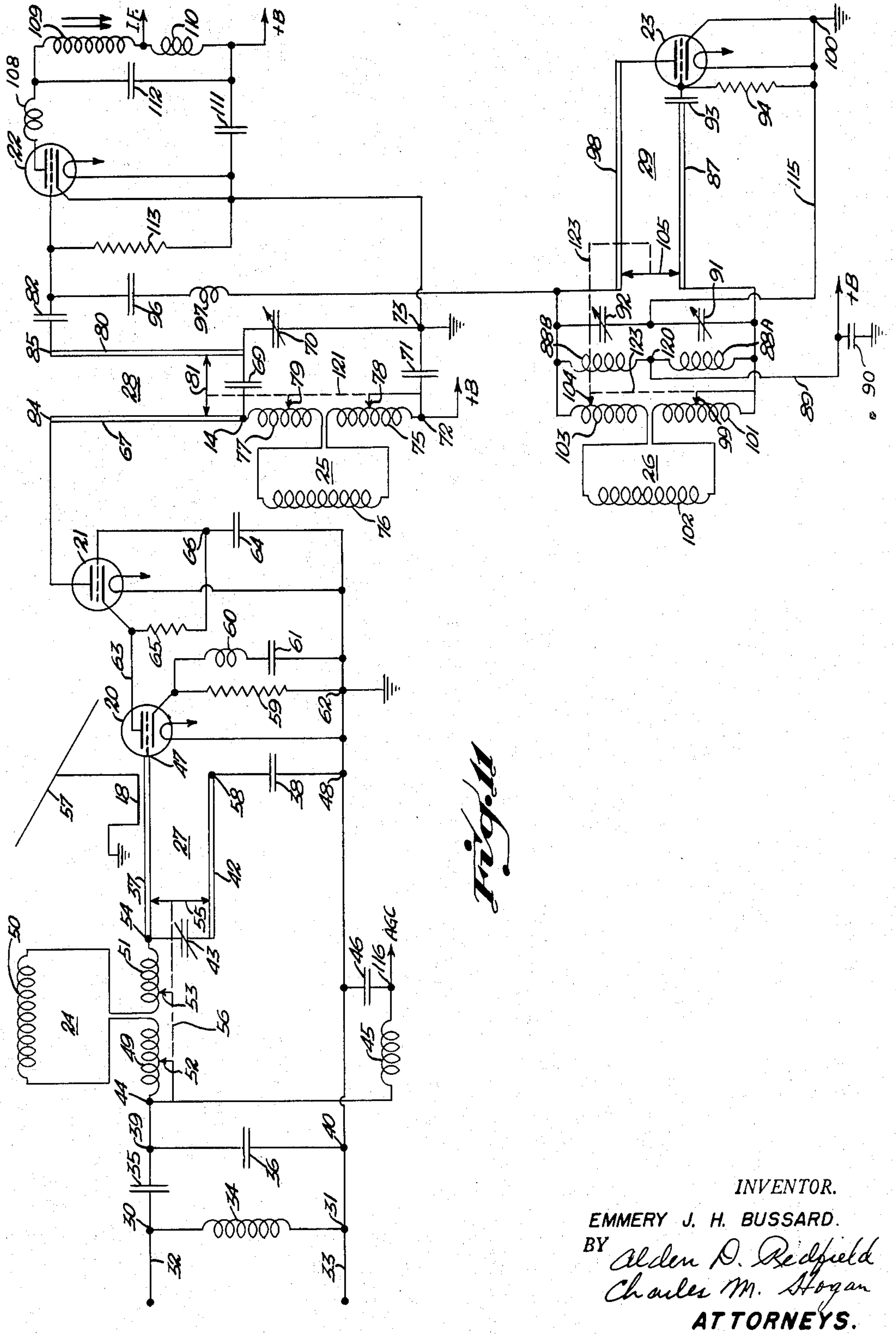
Figures 12, 13, 14, 15, 16, 17:
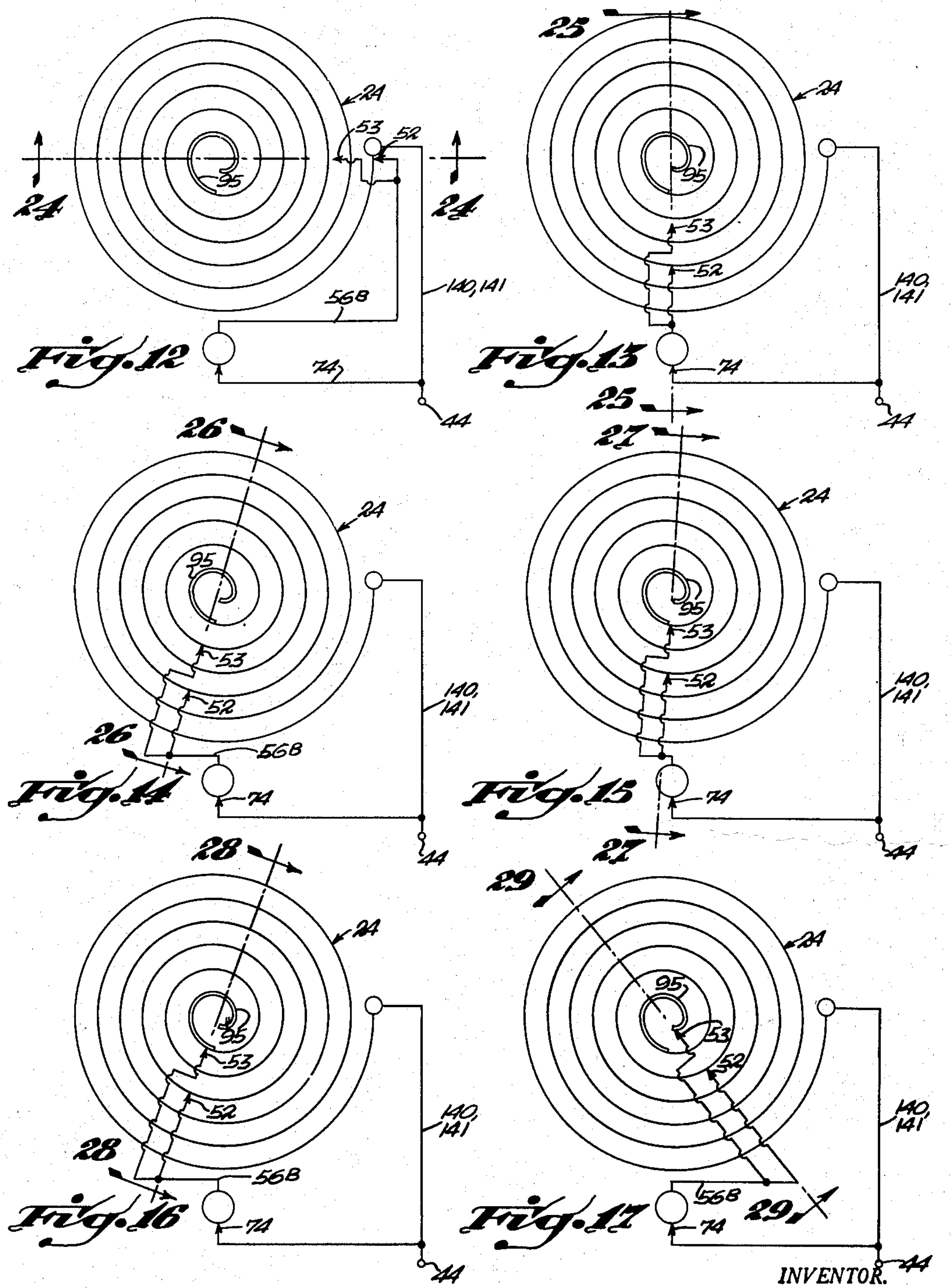

Figs. 3 and 4 are front elevational views of the novel ganged adjusting mechanism in accordance with the invention, the parts being shown in the positions assumed when the receiver is tuned to the lowest V. H. F. channel and to the highest V. H. F. channel, respectively, both of these views showing a complete assembly of adjustable lumped inductors for tuning in the V. H. F. range and adjustable transmission lines for tuning in the U. H. F. range;

Fig. 5 is an enlarged sectional view showing the details of the supporting wafer and the U. H. F. or tuning line side of one of the individual adjusting mechanisms of Figs. 3 and 4;

Fig. 6 is a view similar to Fig. 5 showing the lumped inductor side of the wafer;

Fig. 7 is a sectional view taken on lines 7—7 of Figs. 5 and 6;

Fig. 8 is a detailed perspective view of one of the three U. H. F. short-circuiting bars and supporting arms, variably positioned by a uni-control shaft to adjust the U. H. F. tuning;

Fig. 9 is a detailed perspective view of the two contacts which are used to adjust the lumped inductor for V. H. F. tuning, the contacts being shown in the positions assumed when only the low band contact is touching the spirally wound lumped inductor;

Fig. 10 is a detailed perspective view bearing many points of similarity to Fig. 9 but showing the V. H. F. contacts in the positions assumed when both low and high V. H. F. band contacts are touching the spirally-wound lumped inductor;

Fig. 11 is a circuit schematic of the complete novel combined U. H. F.–V. H. F. tuner in accordance with the invention, this tuner being of particular utility and advantage when employed with a complete ganged adjusting unit as illustrated in whole or in part in Figs. 1 to 10 inclusive;

Figs. 12, 13, 14, 15, 16, and 17 pictorially illustrate in elevation the V. H. F. lumped inductor, and geometrically and symbolically show the relationships among the two V. H. F. contacts and the V. H. F. spiral during the following distinct representative conditions of operation:

Fig. 12—receiver tuned to low end of lower V. H. F. band

Fig. 13—receiver tuned to high end of lower V. H. F. band

Fig. 14—receiver tuned to low end of higher V. H. F. band

Fig. 15—receiver tuned to high end of higher V. H. F. band

Fig. 16—receiver tuned to low end of U. H. F. band

Fig. 17—receiver tuned to high end of U. H. F. band

Figure 18:
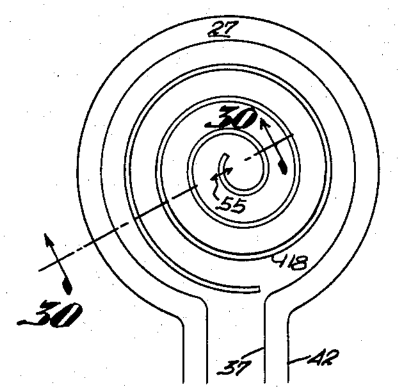

Figs. 18, 19, 20, 21, 22, and 23 pictorially illustrate the U. H. F. tuning line in elevation, and symbolically and geometrically show the relationships between the U. H. F. shorting bar or bridging contact and the tuning line when the following sets of conditions prevail, respectively:

Fig. 18—receiver tuned to low end of lower V. H. F. band

Figure 19:
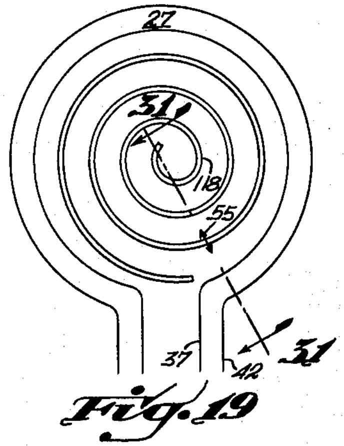

Fig. 19—receiver tuned to high end of lower V. H. F. band

Figure 20:
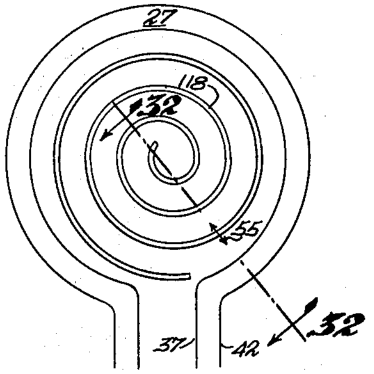

Fig. 20—receiver tuned to low end of higher V. H. F. band

Figure 21:
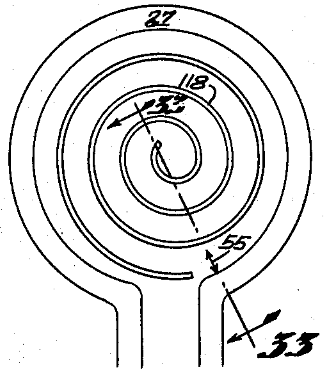

Fig. 21—receiver tuned to high end of higher V. H. F. band

Figure 22:
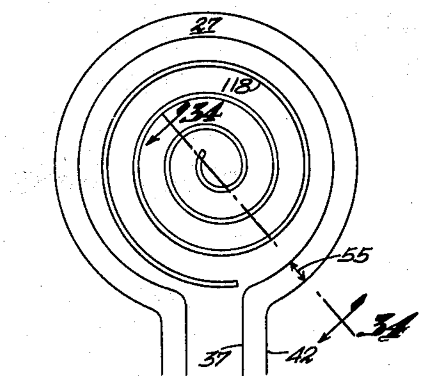

Fig. 22—receiver tuned to low end of U. H. F. band

Figure 23:
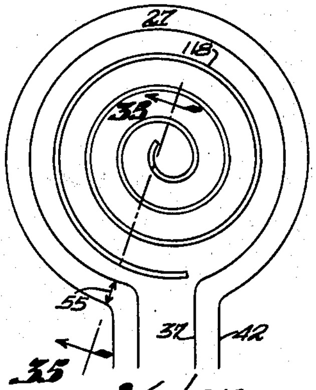

Fig. 23—receiver tuned to high end of U. H. F. band

Figure 36:
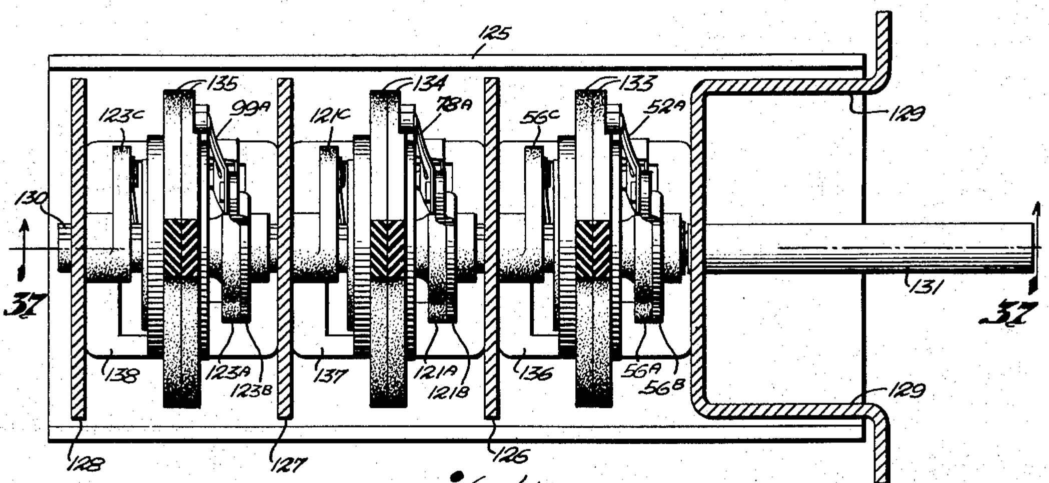
Figure 37:
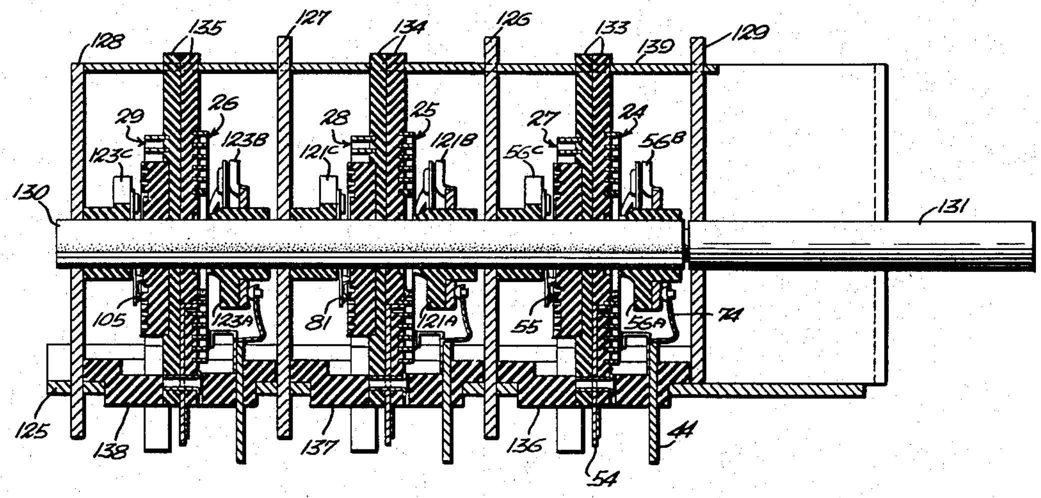
Figure 38:
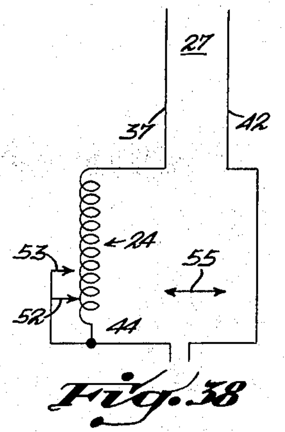

Figs. 24, 25, 26, 27, 28, and 29 are cross-sectional views taken respectively along the section lines 24—24, 25—25, 26—26, 27—27, 28—28, and 29—29 shown in Figs. 12 through 17 inclusive, the cross sections being pictorial so far as the V. H. F. spiral is concerned, but only symbolically representative as to the V. H. F. contacts, this convention being chosen for purposes of clarity in exposition of the operation of the novel adjusting mechanism provided by the invention;

Figs. 30, 31, 32, 33, 34, and 35 are fragmentary sectional views taken along the lines 30—30, 31—31, 32—32, 33—33, 34—34, and 35—35 of Figs. 18 through 23, inclusive, the sections being pictorial but the representations of the shorting bar being abstract and symbolical;

Fig. 36 is a top view of the adjusting mechanism shown as removed from the casing and with the parts in the position assumed when the receiver is tuned to the lowest V. H. F. channel;

Fig. 37 is a sectional view taken along the line 37—37 of Fig. 36, looking in the direction of the arrows; and Figs. 38, 39, 40, 41, 42, and 43 are, respectively, symbolical electrical representations of the circuit conditions prevailing in the lumped inductor portion of the adjusting mechanism associated with the R. F. input of the complete tuner during the following sets of conditions:

Fig. 38—receiver tuned to low end of lower V. H. F. band

Figure 39:
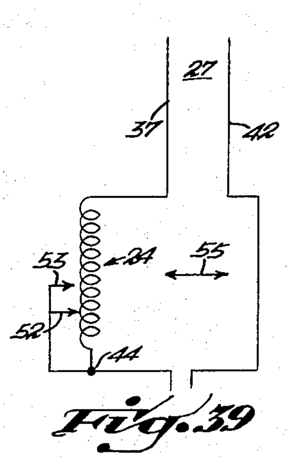

Fig. 39—receiver tuned to high end of lower V. H. F. band

Figure 40:
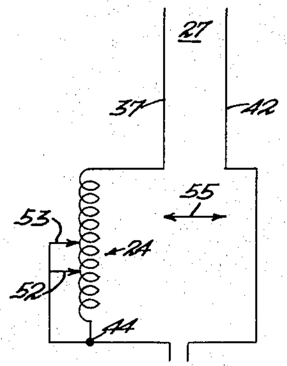

Fig. 40—receiver tuned to low end of higher V. H. F. band

Figure 41:
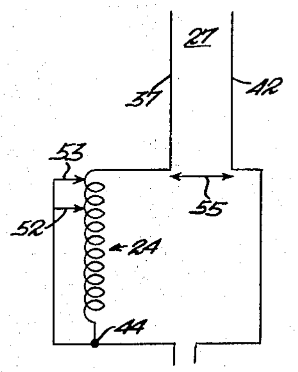

Fig. 41—receiver tuned to high end of higher V. H. F. band

Figure 42:
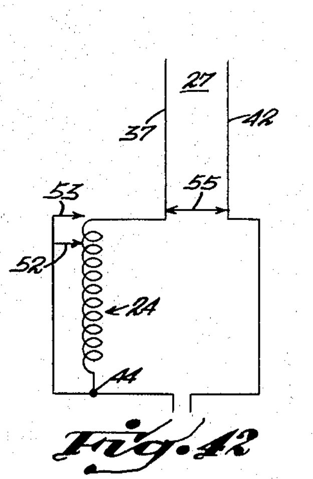

Fig. 42—receiver tuned to low end of U. H. F. band

Figure 43:
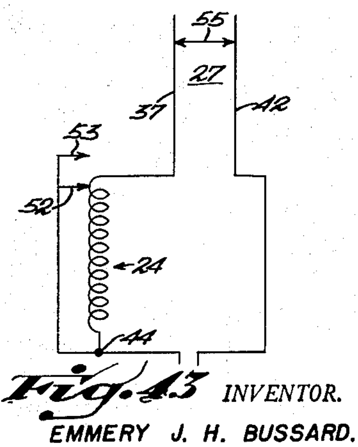

Fig. 43—receiver tuned to high end of U. H. F. band.

Figure 1:
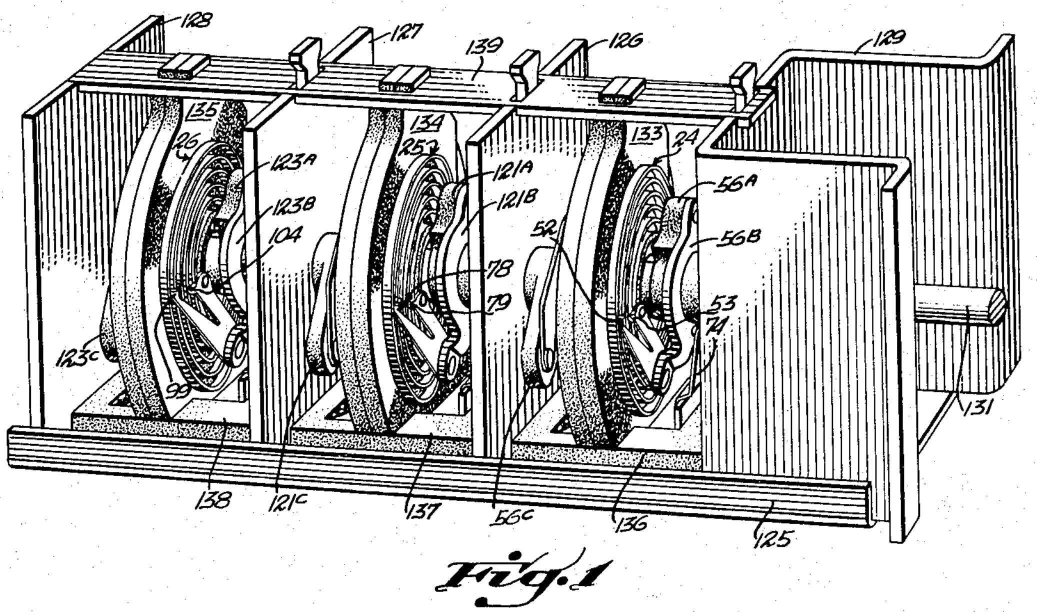
Fig. 1 is a perspective view of the ganged adjusting mechanism provided in accordance with the invention, taken from the front and from such a point of view as to emphasize the lumped inductor components included in the mechanism.
Figure 2:
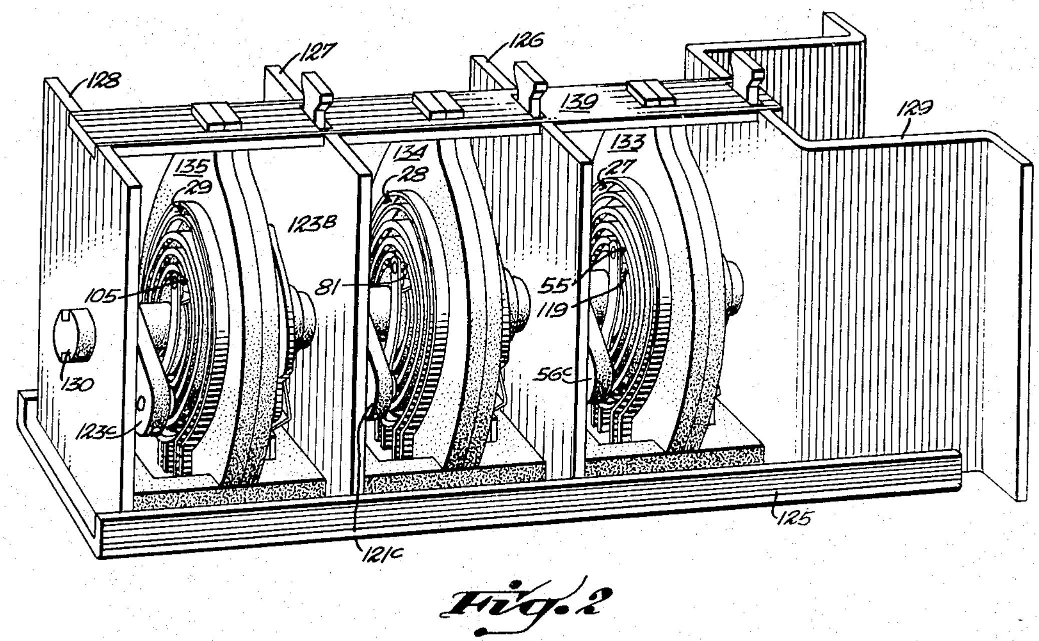
Fig. 2 is a perspective view of the ganged adjusting mechanism, taken from the front and from such a point of observation as to emphasize the tuning line components.

Reference is first made in a preliminary way to Figs. 1 and 2, and particular attention is directed to the ganged adjusting mechanism therein shown. Fig. 1 will immediately be recognized as bearing much of the aspect of a conventional V. H. F. continuous type tuner. An inspection of Fig. 2 reveals, however, that the Fig. 1 adjusting mechanism differs radically from the well-known V. H. F. ganged inductor adjusting mechanism in a number of respects, the most outstanding of which is the incorporation of a plurality of tuning lines for extending the tuning range throughout the U. H. F. band. It is also stated in a preliminary way that Figs. 2, 3, 4, 5, 6, and 7 show details of my novel combination of adjustable lumped inductor and adjustable tuning line, three of these combinations having been included in the ganged adjusting mechanism shown in Figs. 1 and 2. Figs. 8, 9, and 10 show in detail the arrangements for positioning the various contacts to select the desired channel. Figs. 12 through 35 and 38 through 43 are provided in order to simplify the explanation of the operation of the adjusting mechanism and are later considered in detail.

Particular attention is directed to Fig. 11, in which there is presented a schematic circuit diagram of a complete combined U. H. F.-V. H. F. tuner or "front end" of a television receiver. The major components are a pair of radio frequency amplifier tubes 20 and 21, a mixer or frequency-changing tube 22, a local oscillator tube 23, and a ganged adjusting mechanism comprising lumped inductors 24, 25, and 26 and parallel-wire tuning lines 27, 28, and 29. Each of the adjusting mechanisms in the ganged adjusting unit comprises a lumped inductor, such as that indicated by the reference numeral 24, a parallel-wire line section, such as that indicated by the reference numeral 27, and unitary means, hereinafter described in detail, for adjusting the lumped inductor and the tuning line in such a manner as to tune a selector or tank circuit of the receiver through the V. H. F. and U. H. F. ranges in sequence. It will be understood that the combinations of lumped inductor 25-tuning line 28 and lumped inductor 26-tuning line 29 are generally similar to the combination of lumped inductor 24-tuning line 27, and that the three unitary means 56, 121, and 123 illustrated in Fig. 11 are actuated by a common shaft or equivalent and are therefore ganged for continuous unicontrol, as more clearly appears by an inspection of Figs. 1 and 2. The Fig. 11 tuner circuit is electrically an improvement in and an adaptation to combined V. H. F.-U. H. F. operation of the novel V. H. F. tuner circuit illustrated and described in my copending patent application entitled "Tuner for Television Receiver," Serial No. 160,316, filed in the U. S. Patent Office on May 5, 1950, and assigned to the same assignee as the present application and invention. This application has now matured into Patent No. 2,615,983, issued October 28, 1952.

Considering first the V. H. F. input, a V. H. F. antenna (not shown, but various types of which are well known in the art) is coupled to input terminals 30 and 31 by a 150 ohm twin lead transmission line or cable 32, 33. This cable works into and is coupled to a three-element reactive network 34, 35, and 36 for matching the impedance of the transmission line 32, 33 to the input impedance of a series resonant selector circuit 24, 43, 42, 38. The three-element network is of the $\pi$ type, and it comprises a shunt inductor arm 34 connected across the transmission line leads at terminals 30, 31, a series capacitor arm 35 connected between terminals 30 and 39, and a shunt capacitor arm 36 connected between 39 and grounded terminal 40. This network transforms the resistance load which is offered at the terminals 39, 40, looking toward tube 20, to a value of resistance, at terminals 30, 31, required to provide a characteristic impedance load for the transmission line 32, 33. The optimum match occurs at approximately the geometric mean (108 megacycles) of the V. H. F. range. When the tuner is adjusted to 108 megacycles, an impedance of approximately 70 ohms, looking into terminals 39, 40 across which capacitor 36 is connected, is transformed into an impedance approximating 150 ohms, looking into terminals 30, 31 (in the direction of tube 20). The match is workable throughout the V. H. F. range and varies with the tuning within tolerable limits. The capacitors 35 and 36 may be regarded as a capacity divider which steps the impedance down at terminals 39, 40.

The inductor 34 functions as a high pass filter and effectively short-circuits amplitude modulation (AM) broadcast signals in the 540–1600 kilocycle band to ground. This inductor also provides a direct current leakage path and prevents the accumulation of static charges on the antenna.

Inductor 34 and capacitor 35 are shaped to be series resonant at a value between the intermediate frequency and the lowest V. H. F. carrier frequency. At the series resonant frequency there is effectively a short circuit between terminals 39 and 31, and therefore between terminals 39 and 40, grounded terminals 31 and 40 being placed close together, whereby the input circuit of radio frequency tube 20 has substantially no signal voltage impressed on it at the series resonant frequency of the combination 34, 35 or at frequencies near that value, such as the intermediate frequency. Inductor 34 and capacitor 35 therefore provide good intermediate frequency signal rejection. As undesired signals of lower frequencies are considered, capacitor 35 presents a progressively effective series impedance to them and inductor 34 presents a progressively effective shunt, so that at the AM broadcast range the inductor 34 simply short-circuits the undesired signals to ground.

The parameters of inductor 34, capacitor 35, and capacitor 36 are so chosen as to be parallel resonant at a frequency above the intermediate frequency but below the lowest V. H. F. carrier frequency, so that the parallel resonant circuit 34, 35, and 36 "looks like" a net capacitance to the selector circuit 24, 43, 42, 38, throughout the range of V. H. F. operating frequencies. Connected across terminals 39 and 40 is a series resonant band pass selector network comprising an adjustable lumped inductor 24, a trimmer capacitor 43, a conductor 42, and a capacitor 38. These circuit elements are connected in the order named between terminals 39 and 48, the latter being grounded and located so close to terminals 31 and 40 and 62 as to be approximately at the same potential.

The V. H. F. selector network builds up a large R. F. voltage across capacitance 43, 38 at the input of tube 20. The V. H. F. tuning of this selector circuit is made as dependent as possible on the adjustment of lumped inductor 24 and as independent as practicable of capacitance parameters. A return path exists between terminals 39 and 40 for current flow in the selector circuit. This return path comprises three branches, one of which consists of capacitor 36, another of which consists of the series combination of the ACC filter inductor 45 and filter capacitor 46, the third of which consists of the series combination of capacitor 35 and inductor 34, the inductor being paralleled by the V. H. F. antenna system. Shaping this return path to be capacitive throughout the V. H. F. tuning range prevents the introduction of an additional inductance parameter into the V. H. F. selector circuit 24, 43, 42, and 38. The capacitive reactance of this return path is low with respect to the capacitive reactance existing in the input of tube 20 and between terminals 47 and 48.

A conductor 37 is connected to lumped inductor 24 at 54, and to the control electrode of tube 20 at 47. The cathode of tube 20 is connected to grounded point 62 by a resistor 59 paralleled by a series combination of inductance 60 and capacitance 61.

Lumped inductor 24 comprises three portions in series, as indicated by the reference numerals 49, 50, and 51, the whole inductor being formed as a spiral, as shown in Figs. 6, 9, 10, and 12 through 17. A movable contact 52 short-circuits an increasing portion of inductance portion 49 as the receiver is tuned from 54 megacycles (channel 2) to 88 megacycles (channel 6), as indicated in Fig. 9. Electrically connected to contact 52 and movable in unison therewith is a contact 53 which is separated from inductor 24 during operation between 54 and 88 megacycles (channels 2–6 of the V. H. F. band) but snaps into contact with inductance portion 51 to short-circuit inductance portions 49 and 50 and to tune the receiver to 174 megacycles (channel 7) as the tuner is adjusted slightly above channel 6. This expedient ("jump-tuning") accelerates the tuning across the wide band between V. H. F. channels 6 and 7. Contact 53 short-circuits an increasing portion of the series combination of inductance portions 49, 50, and 51 as the receiver is tuned from 174 megacycles (channel 7) to 216 megacycles (channel 13), as indicated by Fig. 10.

Coming now to the V. F. H. operation of the selector circuit just described and all of the circuit elements between the V. H. F. antenna and the input of tube 20, V. H. F. wave signals are intercepted by the V. H. F. antenna and fed through transmission line 32, 33 to the input terminals 30, 31. Those signals then pass through the impedance transmission network 34, 35, 36 and are applied to selector network 24, 43, 42, 38, which is tuned to resonance with the V. H. F. carrier signals in the desired channel. A large R. F. voltage is accordingly built up across capacitance 43, 38 in the selector network and is applied to the input circuit of tube 20 for amplification by the radio frequency amplifier stage.

The description now proceeds to the U. H. F. antenna input to tube 20. A U. H. F. antenna 57 is coupled to tuning line 27 by any suitable expedient such as the capacitive coupling plate 18. Conductors 37 and 42 are the parallel wires of a U. H. F. tuning line. This tuning line is provided with means for adjusting its electrical length or adjustably short-circuiting it in the form of a shorting bar or bridging contact 55. The resonant tuning line is formed as a loop of two conductive ribbons placed on one side of a support shown in Figs. 5, 8, and 18 through 23. The inductor 24 is wound as a spiral on the other side of the support. During V. H. F. operation contact 55 is removed, isolated, or separated from tuning line 27, as shown in Figs. 18 through 21 and 30 through 33.

It will be seen from the foregoing that I have provided, in an adjusting mechanism for a television receiver tuner, the combination of a lumped inductance 24, means 52, 53 for adjusting said inductance, a tuning line 27, means 55 for adjusting the electrical length of said tuning line, and unitary means for controlling both of said adjusting means. The unitary means is shown in Figs. 1, 2, 3, 4, 36, and 37, and is hereinbelow desscribed in detail.

The discussion of U. H. F. operation of the input network of tube 20 is prefaced by further comment on structural features. The trimmer capacitor 43 is connected directly across the leads of transmission line 27 remote from tube 20. Capacitor 38 isolates terminal 58 of line 27 from ground for direct currents. During U. H. F. operation the parallel wire transmission line 27 comprising conductors 37 and 42 functions as a tuning line in the input of tube 20 and is adjusted by shorting bar 55 to select signals in the desired channel from the wave signal energy fed into the line from the U. H. F. antenna. In the embodiment shown in Fig. 11, each of the lines 27, 28, and 29 is adjusted to less than a quarter wave length so as to present an inductive input reactance between the terminals such as 47 and 58. The net inductive reactance of the short-circuited tuning line and the lead inherent inductances resonate the grid-to-ground capacitance and other inherent capacitances in the input circuit of tube 20 to select the desired signal frequency. During U. H. F. operation capacitor 43 effectively connects together for R. F. frequencies the leads of line 27 remote from tube 20, point 54 being then effectively grounded for R. F. currents by the connection to ground through the short-circuiting contact 52 of inductor 24 and capacitor 36.

Bridging contact 55 does not touch line 27 unless the receiver is tuned to the U. H. F. range. As the receiver is tuned from the lowest U. H. F. channel to the higher channels, contact 55 is moved closer to the ends 47, 58 of the tuning line.

The foregoing considerations show that the invention provides, in a band pass selector network for tuning the input of a radio frequency amplifier stage, the combination of an adjustably short-circuited two-conductor U. H. F. tuning line 27, an adjustably short-circuited lumped inductor 24, and means including capacitance 43, 38 for completing a tunable V. H. F. selector circuit. This combination has a number of advantages. During V. H. F. operation the series resonant selector network 24, 43, 42, 38 offers the advantageous selectivity characteristic of such circuits and at the same time provides a substantial gain approximating the product of the selector circuit Q and the input voltage across terminals 39, 40. This series resonant selector network has a low impedance input and a high impedance output on the order of the tube input impedance between terminals 47 and 62. Desirable gain and selectivity characteristics are also manifested during U. H. F. operation by the tuning line 27 in the input of tube 20. The outstanding advantage of the circuitry so far described in detail is that the circuit fully exploits an adjusting mechanism in which only a simple continuous motion is required to tune the input of tube 20 through the V. H. F. and U. H. F. bands. The radio frequency amplifier is of the grounded cathode input-grounded grid output type, comprising two triodes 20 and 21, the anode of triode 20 being directly connected to the cathode of triode 21 by a conductor 63. An R. F. signal path or ground connection is provided by a capacitor 64 connected between the control electrode of tube 21 and ground. A grid leak resistor 65 is connected between the cathode and control electrode of tube 21. In order to stabilize the input impedance and conductance of tube 20 within acceptable limits, I provide, in the cathode circuit of tube 20, a cathode resistor 59 paralleled by a series combination of inductance 60 and capacitance 61. The R. F. amplifier connections are completed by connecting the anode of tube 21 in circuit with the positive terminal (+B) of a space current source through a conductive path comprising conductor 67 of tuning line 28 and lumped inductor 25.

A second selector network is incorporated in the anode circuit of tube 21. Considering first the V. H. F. circuitry, there is provided a parallel resonant selector circuit comprising lumped inductor 25 paralleled by a series combination of capacitors 69 and 70. The plate circuit direct current path between the plate of tube 21 and the positive terminal (+B) of the space current source comprises conductor 67 (connected to the plate at 84), inductor 25 (connected to conductor 67 at 14), and terminal 72 of inductor 25, which is connected to the space current source. Capacitors 69 and 70 are connected in series between terminal 14 of inductor 25 and the grounded point 73. Terminal 72 of inductor 25 is grounded for R. F. currents by capacitor 71. Conductor 67 is one wire of tuning line 28, the parallel wire of which is conductor 80. Conductor 80 connects the junction of capacitors 69 and 70 to a coupling capacitor 82, and the remaining terminal of capacitor 82 is connected to the control electrode of frequency-changer tube 22 to complete the coupling from the plate circuit of tube 21 to the grid circuit of tube 22. Capacitor 69 is connected directly across the terminals of the tuning line 28 which are remote from tubes 21 and 22.

Lumped inductor 25 comprises three portions in series, as indicated by the reference numerals 75, 76, and 77, the whole inductor being formed as a spiral and being generally similar in basic construction to inductor 24. A movable contact 78 is provided to short-circuit an increasing portion of inductance portion 75 as the receiver is tuned from 54 megacycles (channel 2) to 88 megacycles (channel 6). Electrically connected to contact 78 and movable in unison therewith is a contact 79 which is separated from inductor 25 during operation between 54 and 88 megacycles (channels 2–6 of the V. H. F. band), but snaps into contact with inductance portion 77 to short-circuit inductance portions 75 and 76 and to tune the receiver to 174 megacycles (channel 7) as the tuner is adjusted slightly above channel 6. This "jump-tuning" arrangement dispenses with the redundant tuning across the unused portion of the spectrum between V. H. F. channels 6 and 7. Contact 79 short-circuits an increasing portion of the series combination of inductance portions 75, 76, and 77 as the receiver is tuned from 174 megacycles (channel 7) to 216 megacycles (channel 13).

Coming now to the V. H. F. operation of the second selector circuit just described and all of the circuit elements between the radio frequency amplifier and the input of mixer tube 22, the amplified V. H. F. wave signal output of the radio frequency amplifier is selected by the parallel resonant plate load 25, 69, 70, which is tuned to resonance with the V. H. F. carrier signals in the desired channel. A large R. F. signal voltage is accordingly built up across capacitor 70 in the selector network and is applied to the input circuit of tube 22 for further amplification and frequency conversion.

The description now proceeds to the U. H. F. interstage coupling between the radio amplifier and the mixer tube. As indicated above, conductors 67 and 80 are the parallel wires of a U. H. F. tuning line which is generally basically similar to line 27. The tuning line 28 is provided with means for adjusting its electrical length or adjustably short-circuiting it in the form of a shorting bar or bridging contact 81. The tuning line is formed as a loop of the two conductive ribbons placed on one side of a support. During V. H. F. operation contact 81 is removed, isolated, or sepaarted from tuning line 28.

It will be seen from the foregoing that I have provided a tunable interstage band pass selector network for coupling the anode circuit of a radio frequency stage to the input of a frequency-changing stage. This selector network comprises an adjustably short-circuited two-conductor U. H. F. tuning line 28 having a first conductor 67 connected at one end to the anode of the radio frequency stage and a second conductor 80 coupled at the corresponding end by capacitor 82 to an input terminal of the frequency-changer tube 22. The selector network also comprises an adjustably short-circuited lumped inductor 25 connected in series with the first inductor 67 and means including capacitors 69 and 70 for completing a tunable V. H. F. selector circuit. The tunable line 28, the lumped inductor 25, and the means for adjusting the inductor and line in sequence are included in the ganged adjusting unit illustrated in Figs. 1 and 2.

During U. H. F. operation the parallel wire transmission line 28 functions as a tuning line in the output of tube 21 and is adjusted by shorting bar 81 to select signals in the desired channel from the wave signal energy appearing in the output of tube 21. The line 28 is adjusted to less than a quarter wave length in order to present an inductive input reactance at the terminals 84 and 85. The net inductive reactance of the short-circuited tuning line and the inherent lead inductances resonate the plate-to-ground capacitance of tube 21 and the grid-to-ground capacitance of tube 22 and other associated inherent capacitances to select the desired signal frequency. During U. H. F. operation capacitor 69 effectively connects together for R. F. frequencies the leads or terminals of line 28 remote from tubes 21 and 22, point 14 then being effectively grounded for R. F. currents by the connection to ground through the short-circuiting contact 78 of inductor 25 and capacitor 71.

Bridging contact 81 does not touch line 28 unless the receiver is tuned to the U. H. F. range. As the receiver is tuned from the lowest U. H. F. channel to the higher channels, contact 81 is moved closer to the ends 84, 85 of the tuning line.

The tunable output circuit of tube 21 provided in accordance with the invention enhances gain and selectivity in the translation of desired signals and the rejection of undesired signals. It will be understood that line section 28 is preferably formed as a loop of two conductive ribbons on one side of a support. The lumped inductor 25 is wound as a spiral on the other side of the support. The shorting bars 81 and 55 move in unison. Contacts 52 and 78 are synchronized and contacts 53 and 79 are synchronized. It will be understood, therefore, that the output and input circuits of the radio frequency amplifier stage are both tuned throughout the V. H. F. and U. H. F. ranges by the continuous motion of a control shaft.

Local oscillations are supplied to the input circuit of the frequency-changing tube 22 by an oscillator including tube 23 and associated circuitry. The oscillator circuit herein shown is essentially an adaptation to combined V. H. F.-U. H. F. operation of the novel oscillator circuit illustrated in my above-mentioned Patent No. 2,615,983 and also in my United States Patents No. 2,579,789, issued December 25, 1951, and No. 2,583,137, issued January 22, 1952. Reference is made to those patents for a general description of the V. H. F. operation of the oscillator. This oscillaor has a V. H. F. grid tank circuit comprising the distributed inductance of conductor 87, inductor 88A and the distributed inductance of conductor 89, all connected in series, and capacitor 90. Capacitor 90 R. F. grounds the end of conductor 89 remote from tube 23 and effectively connects it for R. F. currents to the cathode of tube 23, grounded at 100. This inductance branch 87, 88A, 89 is paralleled by a trimmer capacitor 91, R. F. connected between cathode and control electrode of tube 23, the connections being completed by a grid capacitor 93 and a conductor 115.

The oscillator also has a V. H. F. plate tank circuit comprising the distributed inductance of conductor 98, inductor 88B and the distributed inductance of conductor 89, all connected in series between the anode of tube 23 and the positive terminal (+B) of a space current source. This inductance branch is paralleled by a capacitor 92 effectively connected between the anode and cathode of triode 23. This oscillator is provided with the usual grid capacitor 93 and grid resistor 94, the latter being connected between the control electrode of tube 23 and the point 100 at which the cathode is grounded. Local oscillations are injected from the plate tank circuit of this oscillator into the control electrode circuit of the mixer triode 22 by a coupling network comprising the series combination of an inductor 97 and a capacitor 96. Connected across the inductors 88A and 88B, which are provided by a single coil having a tap 120, is a lumped inductor 26 comprising three portions in series indicated by the reference numerals 101, 102, and 103. Just as the three portions of inductor 24 are wound as a continuous spiral, and so too the three portions of inductor 25, the whole inductance 26 is wound as a continuous spiral. A movable contact 99 is provided to short-circuit an increasing portion of inductance portion 101 as the receiver is tuned from carrier signal reception at 54 megacycles (channel 2) to carrier signal reception at 88 megacycles (channel 6). Electrically connected to contact 99 and moving in unison therewith is a contact 104 which is separated from inductor 26 during carrier frequency reception between 54 and 88 megacycles (channels 2–6 of the V. H. F. band), but snaps into contact with inductance portion 103 to short-circuit inductance portions 101 and 102 and to supply local oscillations appropriate for signal reception at 174 megacycles (channel 7) as the tuner is adjusted slightly above channel 6. Again "jump-tuning" expedites the tuning across the wide band between V. H. F. channels 6 and 7. Contact 104 short-circuits an increasing portion of the series combination of inductance portions 101, 102, 103 as the oscillator is tuned to supply local oscillations appropriate for 174 megacycle reception (channel 7) to higher local oscillation frequencies appropriate for reception at 216 megacycles (channel 13). A suitable intermediate frequency pass band is 41.25–45.75 megacycles, and therefore the illustrative oscillator herein shown is tunable from 100 megacycles to 930 megacycles, roughly.

V. H. F. operation of the oscillator just described is explained in my United States Patents Nos. 2,579,789 and 2,583,137, to which reference has been made. During V. H. F. operation the distributed inductances of conductors 98 and 87 function as end inductors. Their availability as end inductors enhances and simplifies alignment of the tuner.

During V. H. F. operation a portion of the voltage fed back from the anode circuit of tube 23 to the grid circuit is applied through the common distributed inductance provided by the conductor 89. The anode supply circuit for tube 23 may be traced from the plate of tube 23 through conductor 98, inductor 88B, and conductor 89 to the +B terminal of the space current source. The capacitors 91 and 92 function as a voltage divider network between input and output circuits, the voltages for their respective terminals remote from one another being approximately 180 degrees out of phase, so that feedback also results from this arrangement of the capacitors 91 and 92. The common inductor 89 assures high impedance coupling even at the highest V. H. F. operating frequencies, and the signal strength of the local oscillations is preserved during reception on the upper V. H. F. channels. In this oscillator circuit the magnetic feedback coupling between the plate and grid circuits increases as the operating frequency is increased, during V. H. F. reception.

The oscillator possesses a high degree of stability throughout the range of V. H. F. reception, both grid and plate tank circuits being tuned in unison. V. H. F. tuning is, of course, effected by adjustment of contacts 99 and 104 of lumped inductor 26.

The description now proceeds to the U. H. F. features of the oscillator. A tunable transmission line 29 comprising conductors 98 and 87 and a short-circuiting bar 105 is provided between the anode and control electrode of tube 23, the leads of this line remote from tube 23 being connected across the terminals of the lumped inductor 26. During U. H. F. operation the parallel wire transmission line 29 functions as a tuning line, and it is adjusted by shorting bar 105 to provide local oscillations of the frequency appropriate for the reception of the desired channel. In the embodiment shown in Fig. 11, the net inductive reactance of the tuning line 29 and the lead inherent inductances resonate the inter-electrode capacitances of tube 23 at the desired local oscillation frequency, the oscillator then functioning as a simple line oscillator of the bridge type. The U. H. F. oscillator tank circuit is tuned to the desired local oscillation frequency by adjustment of bridging contact 105, determining the electrical length of the transmission line 29. Contact 105 does not touch line 29 unless the receiver is tuned to the U. H. F. range. As the receiver is tuned from the lowest U. H. F. channels to the higher channels, contact 105 is moved closer to the ends of line 29 adjacent tube 23.

It will be understood that the contact 105 is ganged for motion with the other shorting bars 81 and 55. Similarly, the action of the contacts 99 and 104 is synchronized with the actions of contacts 78, 79 and 52, 53. Again lumped inductor 26 is wound as a spiral on one side of a support, and line 29 is provided in the form of a loop of two conductive ribbons disposed on the other side of the support. The combination of line 29 and lumped inductor 26, together with the unitary adjusting means, is included in the novel ganged adjusting unit illustrated in Figs. 1 and 2. The inductances 24, 25, and 26 and the line sections 27, 28, and 29 are suitably shaped to provide the desired tracking between the preselector circuits and the oscillator.

The mixer tube cathode is grounded at 73. A grid resistor 113 is connected between grid and cathode of the mixer tube. Capacitor 82 is the grid capacitor. This tube has a plate load consisting of a series combination of inductor 108, inductor 109, and inductor 110, the anode circuit being completed for high frequency signals by a capacitor 111 and for direct current by a connection of inductor 110 to the positive terminal (+B) of the space current source. Capacitor 112 is connected across the series combination of inductors 109 and 110.

Automatic gain control potential is supplied to the grid of tube 20 from terminal 116, the latter being connected to an appropriate source of automatic gain control potential (not shown). This source may be identical to that shown in U. S. Patent 2,559,038 to Bass. Interposed between the A. G. C. source and the control electrode of tube 20 is a filter network comprising a shunt capacitor 46 and a series inductance 45, the latter being in series with inductor 24 and conductor 37 and the grid of tube 20.

The output of the above-described tuner circuit is coupled to the input of an intermediate frequency amplifier (not shown) by circuitry known in the art for attenuating undesired signal frequencies and translating without attenuation the intermediate frequency signals, centered about 43.5 megacycles, for example.

In Fig. 11 and the foregoing description, I have described, in a combined U. H. F.-V. H. F. tuner for a television receiver, the combination of a plurality of adjustable tuning lines 27, 28, and 29, a plurality of adjustable lumped inductors 24, 25, and 26, other circuit elements inclusive of the radio frequency amplifier tubes 20, 21, the local oscillator tube 23, and the frequency-changing tube 22 for utilizing said inductors and lines to convert received carrier frequency signals into intermediate frequency signals, and continuously movable unicontrol means for said lines and inductors. The unicontrol means comprises the mechanism controlling the operation of the shorting contacts 55, 81, and 105, and the movable contacts 52, 53, 78, 79, 99 and 104.

The description now proceeds to a discussion of the ganged adjusting mechanism illustrated in Figs. 1 and 2, which mechanism includes the continuously movable unicontrol means.

The supporting framework for the ganged adjusting mechanism is of a well-known conventional construction such as that usually employed with V. H. F. continuous tuners. It is made of a magnetic material, such as steel, and it comprises a metallic base 125, upstanding metallic partition members 126 and 127, and side members 128 and 129, the various framework members all being secured together by appropriate expedients well known to the art and inclusive of a top member 139. The framework elements 125, 126, 127, 128, 129, and 139 and the dust cover (not shown) are heavily plated with a high-conductivity metal and provide electrostatic and electromagnetic shielding. The end member 129 is of a generally U-shaped configuration providing a compartment for the reception of the plurality of metallic dogs included in the limit stop device (not shown) commonly incorporated in continuous tuners. All of the rotating parts of the tuner provided in accordance with the invention are actuated by a common unicontrol shaft 130, the ends of which are suitably journaled or otherwise supported for rotation in bearings in the end members 128 and 129 of the framework. The shaft 130 is made of a ceramic or other suitable durable insulating material. The frame members 126, 127, 128, and 129 are suitably apertured to receive shaft 130, which projects through all of them either directly or by extension. Secured to the end of shaft 130 adjacent end member 129 is a metallic extension 131, which is conventionally provided with a manually manipulatable dial (not shown) positioned by the operator in selecting the desired channel. The construction and operation of the unicontrol shaft 130, the metallic extension 131, and the framework 125, 126, 127, 128, 129, and 139 are conventional and need not be described in further detail.

The framework provides three compartments, in each of which is located a combination of lumped inductor, tuning line, and adjusting means in accordance with the invention. The framework provides shielding between the compartments. Support for the lumped inductors and tuning lines is afforded by the upstanding dielectric two-part wafers 133, 134, and 135, each of which is centrally apertured to receive shaft 130. A single reference numeral is used for each wafer because it is within the practice of the invention to make each wafer as a single integrated part. Each wafer as herein illustrated consists of two abutting generally circular pieces of dielectric material upstanding from an insulating base member 136, 137, or 138, the construction of such base members being well known to the art. The insulating supports 133, 134, and 135 are securely positioned in the framework by the metallic top member 139. An inspection of Figs. 1, 2, 3, 4, 36, and 37 reveals that the construction and operation of each of the three adjustable lumped inductor-tuning line combinations contained in the complete ganged adjusting unit are identical, except for matters of design, such as tracking, not here pertinent. Accordingly, for purposes of simplification and clarity, there is chosen for detailed description the exemplary lumped inductor-tuning line combination which is disposed between framework members 126 and 129 (Figs. 1 and 2), which includes lumped inductor 24 (see also Fig. 11), tuning line 27, supporting wafer 133, supporting base 136, and contacts 52, 53, and 55, this combination being utilized to tune the input of the radio frequency amplifier. The lumped inductor-tuning line combination used to tune the output of the radio frequency amplifier and comprising the elements 25, 28, 78, 79, and 81 (see Figs. 1, 2, and 11) and associated with wafer 134 and base 137 is not further herein discussed in detail because of its similarity in construction and operation to the exemplary combination chosen for extended discussion. The lumped inductor-tuning line combination employed to tune the oscillator and comprising inductor 26, tuning line 29, and contacts 99 and 104 and 105 (see Figs. 1, 2, and 11) and associated with wafer 135 and base 138 is not herein further described in detail for the reason already assigned. It will be understood that the particular order of layout of the three combinations (Fig. 1) herein shown is illustrative only.

Reference is now made particularly to Figs. 5, 6, 7, and 8 in the following specific description of the lumped inductor-tuning line combination chosen for detailed illustrative discussion. The tuning line 27 comprises a pair of conductive metallic ribbons 37 and 42 placed on one side of wafer 133 and the ribbons are imbedded in the wafer, as best shown in Figs. 5 and 7. The insulating base 136 is suitably formed for the reception of the four terminals of the transmission line 37 and for the security of the ensemble on the metallic frame base 125. The spirally wound lumped inductor 24 is disposed on and imbedded in the other side of the wafer 133, as best shown in Figs. 6 and 7, the inner end of the spiral being brought out to a terminal in the base 136 (see Figs. 6 and 11) by a metallic conductor 54 (Fig. 6).

An inspection of Fig. 7 reveals that the lumped inductor 24 and the tuning line 27 are symmetrically disposed relative to shaft 130 and are of such size that the outside diameter of spiral 24 is approximately equal to the greatest diameter of the tuning line 27. The spiral embraces approximately five and a quarter turns (see Fig. 6). The lumped inductance 24 is provided with adjusting means (Figs. 9, 10) in the form of an arm having bifurcations 52A and 53A, the arm being of resilient conductive metallic material and the bifurcations terminating in contacts 52 and 53. This contact arm is secured to a metallic contact carrier 56B which in turn is secured to an arm of insulating material 56A secured to shaft 130 in conventional fashion. The reference numerals 56A and 56B are applied to the insulating arm and to the contact carrier 56B because of the fact that these two elements and element 56C taken together comprise the element 56 symbolically shown in Fig. 11 and are included in the unitary means for controlling the V. H. F. contacts 52 and 53 and the U. H. F. contact 55. The U. H. F. contact arm 55A terminates in a shorting bar or contact 55 at its free end, the other end of the arm being secured to an insulating arm 56C fixed to and mounted for rotation with shaft 130. When the operator turns shaft extension 131, shaft 130 and members 56A, 56B, and 56C move in synchronism.

The details of V. H. F. contacts 52 and 53, metallic contact carrier 56B, and insulating arm 56A are illustrated in Figs. 9 and 10 and are per se of the prior art. Contact carrier 56B is apertured to receive in a press fit an integral collar portion of arm 56A, and the collar portion of insulating arm 56A is keyed to shaft 130 so that shaft 130 controls the positions of contacts 52 and 53. Insulating arm 56C has an integral collar portion which is similarly keyed to shaft 130, as shown in Fig. 8, whereby shaft 130 also controls the position of contact 55.

Figures 24, 25, 26, 27, 28, 29:
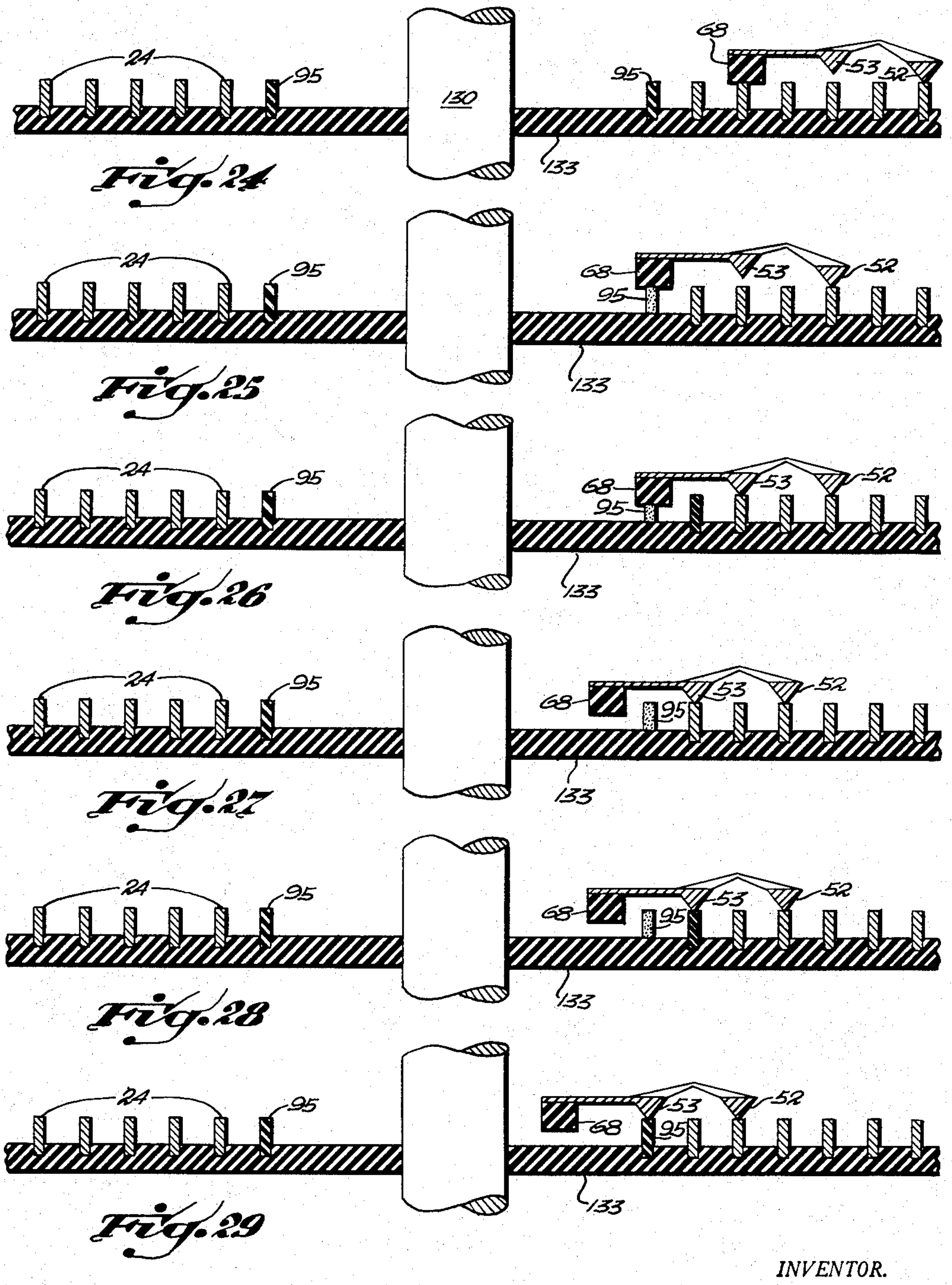

Particular attention is directed to a cam follower or lifter 68 symbolically shown in Figs. 24 through 29 and illustrated in Figs. 9 and 10. This lifter is made of insulating material and secured to the underside of contact arm bifurcation 53A at a point radially inwardly from contact 53. The function of this lifter 68 is to cooperate with the lumped inductor 24 and a spiral guide track 95 to cause contact 53 to be lifted away from inductor 24 or to be placed in contact with inductor 24, as desired. Contact 53 is shown in the lifted position in Figs. 9, 24, and 25, and in the depressed position in Figs. 10, 26, 27, 28, and 29. Particular attention is also directed to the spiral guide or insulator 95 best illustrated in Figs. 6, 9, 10, 12 through 17, and 24 through 29. Looking toward wafer 133 from the right side, it will be observed that the spiral 95 begins at approximately the 6 o'clock position, is wound counter-clockwise approximately one turn, and terminates at approximately the 6 o'clock position, as best shown in Figs. 12 through 17. The guide 95 is formed of insulating material, and it terminates in substantial continuity with the conductive ribbon forming lumped inductor 24, the latter being wound counter-clockwise (from the same point of observation) with approximately five and one quarter turns, beginning at the 6 o'clock position and terminating at approximately the 3 o'clock position. Reference is made to Figs. 12 through 17 for illustrations of these factors. Referring now to Fig. 24, it will be seen that lifter 68 is in contact with the lumped inductor 24 when the receiver is tuned in the lower V. H. F. band, and it then lifts contact 53 away from lumped inductor 24. When the receiver is tuned to the highest low-band V. H. F. channel, as best shown in Fig. 25, lifter 68 is then in contact with the insulating spiral 95 to keep contact 53 lifted away from inductor 24. When the receiver is tuned above that frequency, for example, to the lowest high-band V. H. F. channel, as illustrated in Fig. 26, or to any still higher channels, as illustrated in Figs. 27 through 29, then lifter 68 is no longer being cammed upwardly either by the lumped inductor or by the insulating spiral 95, and contact 53 is accordingly then in a depressed position.

Figure 33:
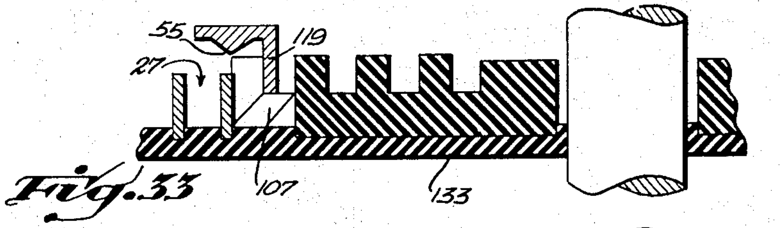
Figure 34:
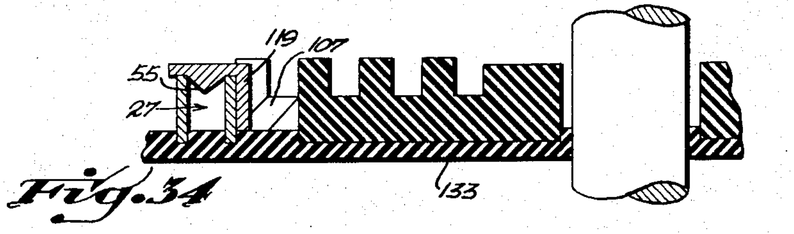

Looking now toward the left side of wafer 133 (i. e., at Fig. 5), particular attention is directed to another spiral guide track having a land and groove and generally indicated by the reference numeral 118. The land of guide track 118 begins at approximately the 10 o'clock position (see Figs. 5 and 18 through 23) and then is wound counter-clockwise (looking at the left side of wafer 133) approximately three and three-eighths turns, finally terminating at approximately the 5:30 o'clock position adjacent conductor 37 of tuning line 27. When the receiver is tuned to any channel below the U. H. F. band, contact 55 rides on the land of this spiral guide track 118, which guide track is made of insulating material and is rigidly secured to wafer 133, as indicated in Figs. 7 and 8. Attention is further directed to an integral projection 119 best shown in Figs. 2 and 3 and symbolically illustrated in Figs. 30 through 35. This projection is integral with contact arm 55A, or otherwise suitably secured thereto, and it rides in the groove of spiral guide 118 and cooperates with the groove to guide contact 55. As the receiver is tuned up to the lowest U. H. F. channel, the projection 119 slides downwardly and outwardly on the groove terminus 107 of guide track 118 and places contact 55 in contact with tuning line 27 (as best shown in Figs. 5 and 34). It will be understood that track 118 may be molded integrally with wafer 133.

From the foregoing it will be seen that the invention provides, in a continuous U. H. F.-V. H. F. tuner for a television receiver, an adjusting mechanism comprising, in combination, an insulating support 133, a spiral inductor 24 mounted on one side of said support, a control shaft 130 projecting centrally through said support, a curved parallel conductive tuning line 27 mounted on the other side of said support 133, means including a first contact arm 52A, 53A rotatable with said shaft 130 for short-circuiting a variable portion of said spiral inductor 24 to tune the receiver through the V. H. F. band, means including a second contact arm 55A rotatable with said shaft 130 for short-circuiting a variable portion of said line 27 to tune the receiver through the U. H. F. band, a spiral guide track 118 of insulating material disposed on said support 133 in concentric relation to and radially within said tuning line 27 for guiding said second arm 55A during V. H. F. tuning when it is not in contact with said line 27, the convolutions of the track 118 being opposite to those of the spiral inductor 24, whereby as said control shaft 130 is turned in a direction to displace the first arm 52A radially inwardly, the second arm 55A is displaced radially outwardly (this operation being clearly illustrated in Figs. 12 through 23), and, conversely, so that said inductor 24 and line 27 are adjusted in sequence by a continuous rotation of said shaft 130. The second arm 55A is provided with a projection 119 for guiding contact 55 when it is not in contact with the tuning line 27. The first arm is conductively united with a leading contact 53 and a lagging contact 52. Spiral guide track insulating means 95 permits conduction between the leading contact 53 and the spiral lumped inductor 24 only when the receiver has been tuned to the lowest channel in the upper V. H. F. band. In a broad aspect, the invention provides, in a continuous tuner, the combination of a lumped inductor 24, a tuning line 27, and means for adjusting the inductor and line in sequence. This means is unitary, and it comprises the contacts 52, 53, and 55, the shaft 130, and the novel arrangements herein shown for controlling the operation of the contacts in the desired sequence.

Coming now to describe the operation of my novel adjusting mechanism, six significant phases of operation will be discussed in detail.

Figure 30:
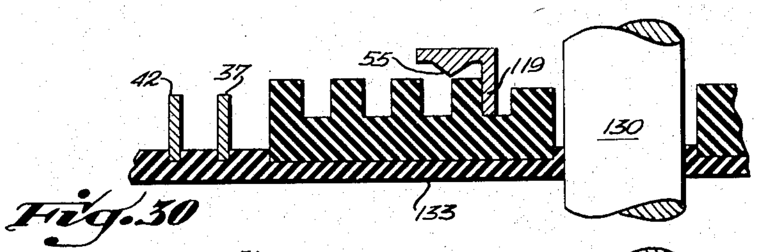

First, it will be assumed that the receiver is tuned to the lowest V. H. F. channel in the lower V. H. F. band, the positions of the parts then being illustrated by Figs. 12, 18, 24, 30, and 38. The shaft 130 and extension 131 are turned counter-clockwise to the limit stop (looking at the right side of wafer 133). The lagging V. H. F. contact 52 is then approximately at the 3 o'clock position (Fig. 12), conductively touching the outermost convolution of spiral inductor 24 and at the terminal thereof. The lifter 68 is riding on inductor 24 and keeping contact 53 isolated or separated from inductor 24, as shown in Fig. 24. The leading contact 53 is displaced approximately two turns inwardly from the lagging contact 52. The U. H. F. contact 55 is inactive and is riding on the inner convolution of the land of guide track 118 at approximately the 8 o'clock position (Figs. 18 and 30). As illustrated in Fig. 38, only a small portion of inductor 24 is now short-circuited by contact 52.

Figure 31:
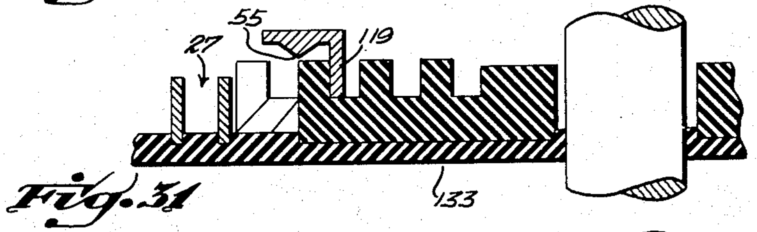

Second, it will now be assumed that the receiver is to be tuned to the highest V. H. F. channel in the lower V. H. F. band, the positions of the parts then being illustrated by Figs. 13, 19, 25, 31, and 39. To attain this condition the operator turns shaft extension 131 clockwise (looking at the right side of wafer 133) through approximately two and one quarter turns from the position first considered. The lagging V. H. F. contact 52 is then approximately at the 6 o'clock position (Fig. 13), conductively touching the spiral inductor 24 at approximately the end of the third turn. The lifter 68 is riding on the inner end of land 95 and still keeping contact 53 isolated or separated from inductor 24, as shown in Fig. 25. The leading contact 53 is displaced approximately two turns inwardly from the lagging contact 52. The U. H. F. contact 55 is still inactive and is riding on the land of guide track 118 at approximately the 5 o'clock position (Figs. 19, 31). As illustrated in Fig. 39, a larger portion of inductor 24 is now short-circuited by contact 52. It should be particularly noted that the whole lower V. H. F. band has been covered by only two and one quarter turns of shaft 130.

Figure 32:
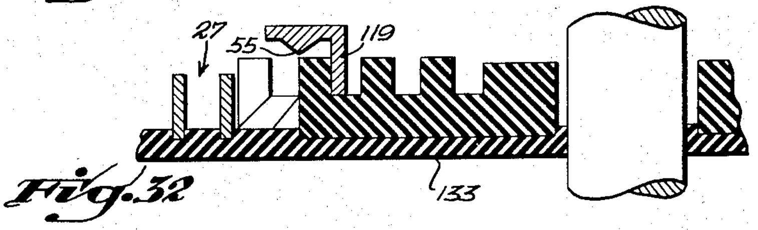

Third, it will be assumed that the receiver is tuned to the lowest V. H. F. channel in the upper V. H. F. band, the positions of the parts then being illustrated by Figs. 14, 20, 26, 32, and 40. To attain this position, the shaft 130 and extension 131 are turned clockwise an additional 15 degrees or so (looking at the right side of wafer 133). The lagging V. H. F. contact is then approximately at the 6:30 o'clock position (Fig. 14), conductively touching spiral 24 near the end of the third turn. The lifter 68 is no longer riding on guide 95, and contact 53 is now touching inductor 24, as shown in Fig. 26. The leading contact 53 is displaced two turns inwardly from the lagging contact 52. The two turns of spiral 24 between contacts 52 and 53 (as shown in Fig. 14) are that portion of the inductor to which the reference numeral 50 is applied in Fig. 11. The portion of inductor 24 inward of contact 53 in Fig. 14 corresponds to that designated 51 in Fig. 11. The portion of inductor 24 outwardly of contact 52 (the positions being shown in Fig. 14) is that portion numbered 49 in Fig. 11. The U. H. F. contact is inactive and is still riding on the land of guide track 118 at approximately the 4:30 o'clock position (Figs. 20 and 32). As illustrated in Fig. 40, a larger portion of inductor 24 is now short-circuited by contact 53, and portion 50 was completely short-circuited by reason of the last 15 degree movement of shaft 130, permitting extremely rapid traversal of the large unused portion of the spectrum between the highest low-band V. H. F. channel and the lowest high-band V. H. F. channel.

Fourth, it will be assumed that the receiver is tuned to the highest V. H. F. channel in the upper V. H. F. band, the positions of the parts then being illustrated by Figs. 15, 21, 27, 33, and 41. The shaft 130 and extension 131 are turned clockwise (looking at the right side of wafer 133) almost one turn. The lagging V. H. F. contact 52 is then very close to the 6:10 o'clock position (Fig. 15), conductively touching spiral inductor 24 near the end of the second turn. The lifter 68 is not riding high, and contact 53 is in contact with and approaching the inner end of inductor 24, as best shown in Figs. 15 and 27. The leading contact 53 is displaced approximately two turns inwardly from the lagging contact 52. The U. H. F. contact 55 is not yet in position to function as a shorting bar and is riding on the outer convolution of the land of guide track 118 very close to the 4:50 o'clock position (Figs. 21 and 33). As illustrated in Fig. 41, most of inductor 24 is now short-circuited by contact 53.

It should be particularly noted that the upper V. H. F. band has been covered by approximately one turn of shaft 130, so that both V. H. F. bands are completely covered with only about three and one quarter turns of the shaft 130.

Fifth, it will be assumed that the receiver is tuned to the lowest U. H. F. channel, the positions of the parts then being illustrated by Figs. 16, 22, 28, 34, and 42. The shaft 130 and extension 131 are turned clockwise approximately 20 degrees (looking at the right side of wafer 133). The V. H. F. contacts are then approximately at the 6:30 o'clock position, and the leading contact 53 is riding on insulating guide 95, the lagging contact 52 riding near the end of the second turn of the spiral 24 (Figs. 16 and 28). The U. H. F. shorting bar 55 is now active, and as guide 119 slipped down track 107 contact 55 went into contact with transmission line 27 at approximately the 4:30 o'clock position (Fig. 22). As illustrated in Fig. 42, a small portion of tuning line 27 is now short-circuited by contact 55. It will be noted that a small portion of inductor 24 was open-circuited by reason of the separation of contact 53 from inductor 24. This factor places between point 54 and terminal 39 (Fig. 11) a small lumped inductance which decreases in value as the receiver is tuned to higher U. H. F. channels. I have found this small lumped inductance to be useful for tracking purposes.

Figure 35:
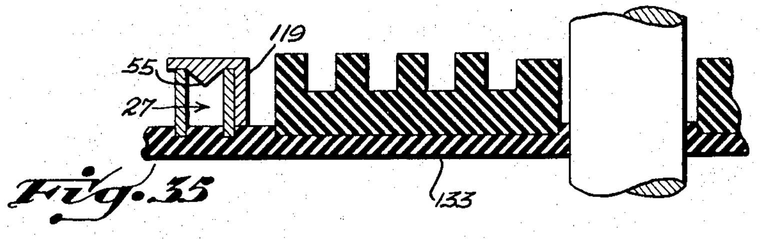

Sixth, it is now assumed that the receiver is tuned to the highest U. H. F. channel, the positions of the parts then being illustrated by Figs. 17, 23, 29, 35, and 43. The shaft 130 and extension 131 are turned clockwise approximately five-sixths of a turn (looking at the right side of wafer 133). The V. H. F. contacts 52 and 53 are then approximately at the 4:30 o'clock position (Fig. 17), contact 53 riding on insulating guide 95 (Fig. 29) and contact 52 riding near the beginning of the second turn of spiral 24. The lifter 68 remains depressed. The U. H. F. shorting bar is active and is riding on transmission line 27 at approximately the 6:30 o'clock position (Figs. 23 and 35). As illustrated in Fig. 43, a large portion of transmission line 27 is now short-circuited by contact 55. It should be observed that the entire U. H. F. range is covered by five-sixths of a single turn of shaft 130. One of the outstanding advantages of the present invention is the fact that both U. H. F. and V. H. F. ranges are covered by a continuous tuner the shaft of which is displaced only slightly more than four turns.

Referring again to Figs. 9 and 10, the contacts 52 and 53 are electrically in circuit with a wiping contact 74 abutting against contact carrier 56B. Wiping contact 74 is brought out to a terminal 44 in conventional fashion. Wiper 74 is connected to the outer end of inductor 24 by serially connected conductors 140 and 141. These connections are symbolically shown in Figs. 12 through 17 and are illustrated in Figs. 1, 6, 9, and 10.

It will be understood from the foregoing description that when the receiver is tuned in the manner described, the positioning of shaft 130 causes each of the three sections (i. e., oscillator, R. F. input, and R. F. output) illustrated in Figs. 1 and 2 to behave in a detailed fashion exemplified by the R. F. input section hereinabove minutely described. It should now be apparent that the invention provides a particularly simple ganged adjusting mechanism and tuner of the continuous type for covering the combined U. H. F. and V. H. F. ranges. This tuner is compact, simple, conveniently manipulated, utilizes a minimum number of switch contacts, and has the other advantages which accrue from the fulfillment of the aforesaid objects.

Another advantage of the present invention resides in the fact that portions of the tuning lines can be employed to supply the whole or part of the end inductance required to predetermine the desired range. It will be understood that in conventional continuous V. H. F. tuning practice with variable inductors it is customary to place an end inductance in series with each variable tuning inductor for this purpose. To illustrate the advantage of the invention in this respect, the element 37 (Fig. 11) can be made to furnish a part or all of the required end inductance for variable inductor 24.

In the illustrative embodiment shown, the insulating arms 56A, 56C, 121A, 121C, 123A, and 123C have been shown rigidly keyed to shaft 130. It will be obvious to those skilled in the art that independent preliminary adjustment of each such insulating arm relative to shaft 130 may be provided if desired. It should be further understood that the ganged adjusting mechanism may conveniently be designed with two, three, or four sections, for example, and that it is not limited to utility with the illustrative tuner circuit shown in Fig. 11.

While there has been shown and described what is at present considered to be the preferred embodiment of the invention, it will be understood by those skilled in the art that various modifications and changes and substitutions of equivalents may be made therein within the true scope of the invention as defined by the appended claims.

Having fully disclosed and described my invention, I claim:

1. In a continuous U. H. F.–V. H. F. tuner for a television receiver, an adjusting mechanism comprising, in combination, a support, a spiral inductor mounted on one side of and with its edge adjacent to said support, a control shaft projecting centrally through said support, a curved parallel-conductor tuning line mounted on the other side of said support, said line consisting of parallel ribbons of conductive material having their edges adjacent said support, a first contact rotatable with said shaft for short-circuiting a variable portion of said spiral inductor to tune the receiver through the lower V. H. F. band, a second and leading contact connected to and joined with the first-mentioned contact for short-circuiting a greater variable portion of said spiral inductor to tune the receiver through the upper V. H. F. band, means comprising a lifter and a spiral insulator continuous with the inner turn of said inductor for removing the second contact from the inductor when the receiver is tuned to a frequency below that of the lowest channel in the upper V. H. F. band, a third contact rotatable with said shaft for short-circuiting a variable portion of said line to tune the receiver through the U. H. F. band, and a spiral guide track of insulating material in continuity with said tuning line for guiding said third contact during V. H. F. tuning when it is not in contact with said line, said inductor, line, contacts, insulator, and guide track being so arranged that said inductor and line are adjusted in sequence.

2. A band-pass selector network for tuning the input of a radio frequency amplifier stage comprising, in combination, a pair of input terminals, a tunable series circuit including a lumped inductor, first capacitor, first conductor, and second capacitor connected in series between said input terminals and in the order named, a second conductor connected directly to said inductor and disposed in parallel with said first conductor to form an open-wire tuning line, said first capacitor being connected across the end of said line adjacent said inductor, a first conductive short-circuiting means for adjusting said inductor to tune said stage in the V. H. F. band, and a second conductive short-circuiting means for adjusting said line to tune said stage in the U. H. F. band.

3. A band-pass selector network in accordance with claim 2, a V. H. F. antenna input circuit coupled to said series tunable circuit, and a U. H. F. antenna input circuit coupled to said line.

4. A band pass selector network in accordance with claim 2, and a vacuum tube having a control electrode connected to said second conductor and a cathode connected to said second capacitor.

5. A tunable interstage band-pass selector network for coupling the anode circuit of a radio frequency stage to the input circuit of a frequency-changer stage comprising an adjustably short-circuited two-conductor U. H. F. tuning line having a first conductor connected at one end to the anode of said radio frequency stage and a second conductor coupled at the corresponding end to an input terminal of the frequency changer stage, an adjustably short-circuited lumped inductor directly conductively connected in series with and connected to one end of said first conductor, two conductive contacts for making the adjustments to line and inductor, and means including capacitance for completing a tunable V. H. F. selector circuit.

6. A network in accordance with claim 5 in which said capacitance comprises a series combination of a first capacitor directly connected across the remaining end of said line and a second capacitor, said series combination being in parallel with said lumped inductor.

7. In a television receiver tuner for U. H. F. and V. H. F. ranges, an oscillator comprising an electron tube having at least cathode, grid, and plate electrodes, a V. H. F. grid tank circuit comprising capacitance between said grid and said cathode paralleled by a series combination of two inductors, a V. H. F. plate tank circuit comprising capacitance between plate and cathode parallelled by a series combination of two inductors, one of the two inductors included in each tank circuit being common to both and being electrically disposed in conductive relation to said anode and between said cathode and the junction of the remaining two inductors, said common inductor providing magnetic coupling between said plate and grid tank circuits, a U. H. F. tank circuit comprising a two-conductor tuning line having one conductor in series circuit between the plate and the plate tank inductors and the other conductor in series circuit between the grid and the grid tank inductors, and a blocking capacitor connected between said grid and said other conductor.

8. In a television receive tuner, an oscillator in accordance with claim 7, a lumped inductor connected across the end of said line remote from said tube, means for adjustably short-circuiting said inductor to tune the V. H. F. tank circuits, and short-circuiting means for adjustably tuning said line.

References Cited in the file of this patent

UNITED STATES PATENTS

| | | |
|---|---|---|
| 1,339,772 | Lowenstein | May 11, 1920 |
| 1,947,003 | Finch et al. | Feb. 13, 1934 |
| 2,126,541 | De Forest | Aug. 9, 1938 |
| 2,505,022 | Wheeler | Apr. 25, 1950 |
| 2,543,560 | Thias | Feb. 27, 1951 |
| 2,551,228 | Achenbach | May 1, 1951 |
| 2,601,445 | Murakami | June 24, 1952 |
| 2,627,579 | Wasmansdorff | Feb. 3, 1953 |
| 2,666,906 | Aust | Jan. 19, 1954 |